US012176594B2

(12) United States Patent
Tessier et al.

(10) Patent No.: US 12,176,594 B2
(45) Date of Patent: Dec. 24, 2024

(54) APPARATUS AND METHODS FOR PROVIDING A COAXIAL TRANSMISSION LINE

(71) Applicant: Acceleware Ltd., Calgary (CA)

(72) Inventors: Lynn P. Tessier, Eckville (CA); Michal M. Okoniewski, Calgary (CA)

(73) Assignee: Acceleware Ltd., Calgary (CA)

(*) Notice: Subject to any disclaimer, the term of this patent is extended or adjusted under 35 U.S.C. 154(b) by 283 days.

(21) Appl. No.: 17/730,972

(22) Filed: Apr. 27, 2022

(65) Prior Publication Data

US 2022/0359968 A1 Nov. 10, 2022

Related U.S. Application Data

(60) Provisional application No. 63/183,899, filed on May 4, 2021.

(51) Int. Cl.
*H01P 3/06* (2006.01)
*H01P 11/00* (2006.01)

(52) U.S. Cl.
CPC .............. *H01P 3/06* (2013.01); *H01P 11/005* (2013.01)

(58) Field of Classification Search
CPC .......... H01P 3/06; H01P 1/045; H01P 11/005; H01P 5/00; H01P 1/202; E21B 17/028; E21B 43/2401; E21B 36/04; E21B 17/206; E21B 47/12; E21B 17/003; E21B 17/0285; E21B 17/042; E21B 17/1078; E21B 43/24; E21B 47/13; E21B 17/026; E21B 17/023; H01B 11/1873; H01B 11/18; H01B 11/1856; H01B 13/0036; H01B 13/20;
(Continued)

(56) References Cited

U.S. PATENT DOCUMENTS 2,757,738 A 8/1956 Ritchey
4,135,579 A 1/1979 Rowland et al.
(Continued)

FOREIGN PATENT DOCUMENTS

CA 2816101 A1 5/2012
CA 2816297 C 5/2017
(Continued)

*Primary Examiner* — Lincoln D Donovan
*Assistant Examiner* — Tyler J Pereny
(74) *Attorney, Agent, or Firm* — SMART & BIGGAR LP; Isis E. Caulder; Sunil R. Rao

(57) ABSTRACT

Coaxial transmission lines and methods of providing thereof are disclosed. The coaxial transmission lines include an inner conductor extending between first and second ends along a longitudinal axis, an outer conductor surrounding the inner conductor along the longitudinal axis, and at least one linear actuator coupled to the inner conductor at the first end for applying a tension force to the inner conductor. The second end of the inner conductor is fixed to an electromagnetic load. The methods involve providing an inner conductor having a longitudinal axis and extending from a first end to a second end; fixing the second end of the inner conductor to an electromagnetic load; providing an outer conductor that surrounds the inner conductor; coupling at least one linear actuator to the inner conductor at the first end; and actuating the at least one linear actuator to apply a tension force to the inner conductor.

26 Claims, 15 Drawing Sheets

(58) Field of Classification Search
CPC ........ H01B 13/004; H01B 7/02; H01B 7/046; H01R 4/56; H01R 43/26; H01R 9/0503
See application file for complete search history.

(56) References Cited

U.S. PATENT DOCUMENTS

| | | | |
|---|---|---|---|
| 4,140,179 | A | 2/1979 | Kasevich et al. |
| 4,140,180 | A | 2/1979 | Bridges et al. |
| 4,144,935 | A | 3/1979 | Bridges et al. |
| 4,193,451 | A | 3/1980 | Dauphine |
| 4,301,865 | A | 11/1981 | Kasevich et al. |
| 4,319,632 | A | 3/1982 | Marr, Jr. |
| 4,320,801 | A | 3/1982 | Rowland et al. |
| 4,449,585 | A | 5/1984 | Bridges et al. |
| 4,470,459 | A | 9/1984 | Copland |
| 4,487,257 | A | 12/1984 | Dauphine |
| 4,508,168 | A | 4/1985 | Heeren |
| 4,513,815 | A | 4/1985 | Rundell et al. |
| 5,293,936 | A | 3/1994 | Bridges |
| 6,189,611 | B1 | 2/2001 | Kasevich |
| 6,981,546 | B2 | 1/2006 | Hall et al. |
| 7,891,421 | B2 | 2/2011 | Kasevich |
| 8,118,093 | B2 | 2/2012 | Hassell et al. |
| 8,408,294 | B2 | 4/2013 | Bridges |
| 8,453,739 | B2 | 6/2013 | Parsche |
| 8,648,760 | B2 | 2/2014 | Parsche |
| 8,763,691 | B2 | 7/2014 | Parsche |
| 8,789,599 | B2 | 7/2014 | Parsche |
| 9,722,400 | B2 | 8/2017 | Koppe et al. |
| 10,337,259 | B2 * | 7/2019 | Benedict ............... E21B 17/023 |
| 10,760,392 | B2 | 9/2020 | Okoniewski et al. |
| 11,359,473 | B2 | 6/2022 | Okoniewski et al. |
| 2011/0042063 | A1 | 2/2011 | Diehl et al. |
| 2011/0146981 | A1 | 6/2011 | Diehl |
| 2011/0303423 | A1 | 12/2011 | Kaminsky et al. |
| 2012/0067580 | A1 | 3/2012 | Parsche |
| 2012/0118565 | A1 | 5/2012 | Trautman et al. |
| 2013/0192825 | A1 | 8/2013 | Parsche |
| 2014/0131032 | A1 | 5/2014 | Dittmer |
| 2014/0216714 | A1 * | 8/2014 | Dittmer ................. E21B 17/028 166/57 |
| 2014/0224472 | A1 | 8/2014 | Parsche |
| 2014/0290934 | A1 | 10/2014 | Parsche |
| 2015/0211336 | A1 | 7/2015 | Wright et al. |
| 2016/0047213 | A1 | 2/2016 | Grounds, III et al. |
| 2016/0168981 | A1 * | 6/2016 | Rodney ................... E21B 47/12 340/854.9 |
| 2017/0204680 | A1 * | 7/2017 | Leismer ............. H01R 13/5219 |
| 2019/0249531 | A1 | 8/2019 | Wright et al. |

FOREIGN PATENT DOCUMENTS

| | | | |
|---|---|---|---|
| EP | 0284402 | B1 | 1/1995 |
| EP | 1779938 | A2 | 5/2007 |
| WO | 2012067769 | A2 | 5/2012 |

* cited by examiner

APPARATUS AND METHODS FOR PROVIDING A COAXIAL TRANSMISSION LINE

CROSS-REFERENCE TO RELATED APPLICATION

This application claims priority from U.S. Provisional Patent Application Ser. No. 63/183,899, filed May 4, 2021, the entire contents of which are hereby incorporated by reference for all purposes.

FIELD

This application relates to the field of coaxial transmission lines, and in particular to apparatus and methods for providing an inner conductor of a coaxial transmission line.

BACKGROUND

Coaxial transmission lines are commonly used for transmitting high frequency power or signals. Coaxial transmission lines are commercially-available, and capable of delivering power or signals over long distances with low losses. Generally, they include an inner conductor surrounded by a concentric conducting shield, with the two being separated by an insulating material.

Coaxial transmission lines are well-known in applications such as communications, radar, electronic and industrial applications. These applications however involve delivering low or medium power to electrical loads in environments having lower pressure and temperature than those usually found within underground oil wells. For high power transmission at ultra-high frequencies (UHF) or microwaves, other options such as rectangular or circular waveguides are available. These options are often impractical at lower frequencies, since at lower frequencies, rectangular and circular waveguides are generally too physically large to be used, a particularly critical feature when transmitting radio frequency (RF) power underground.

Furthermore, the use of coaxial transmission lines in special environments, including aerospace and oil and gas (such as electromagnetic (EM) heating of underground hydrocarbon formations), can present various challenges that require additional design and materials.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In one broad aspect, a coaxial transmission line is disclosed. The coaxial transmission line includes an inner conductor having a longitudinal axis and extending from a first end to a second end; an outer conductor surrounding the inner conductor along the longitudinal axis; and at least one linear actuator coupled to the inner conductor at the first end for applying a tension force to the inner conductor. The second end of the inner conductor is fixed to an electromagnetic load.

In at least one embodiment, the at least one linear actuator can include one or more coupling elements for coupling the at least one linear actuator to the inner conductor, and at least a portion of the one or more coupling elements can be non-conductive.

In at least one embodiment, the at least one linear actuator can include one of a hydraulic actuator or an electromagnetic actuator.

In at least one embodiment, the coaxial transmission line can include a gas actuation system that is separate from a dielectric fluid isolating the inner conductor, and the at least one linear actuator can include a pneumatic actuator actuable by the gas actuation system.

In at least one embodiment, the at least one linear actuator can include a pneumatic actuator, and the coaxial transmission line can include a dielectric fluid insulator for isolating the inner conductor from the outer conductor and for actuating the pneumatic actuator.

In at least one embodiment, the at least one linear actuator can include a plurality of linear actuators positioned circumferentially around the longitudinal axis of the inner conductor at the first end.

In at least one embodiment, the plurality of linear actuators can be positioned circumferentially around at least part of the inner conductor at the first end.

In at least one embodiment, the coaxial transmission line can include a crosshead for coupling the plurality of linear actuators to the inner conductor at the first end.

In at least one embodiment, the crosshead can be non-conductive.

In at least one embodiment, each of the plurality of linear actuators can include an actuator housing and a piston therein.

In at least one embodiment, the plurality of actuator housings can be coupled to the outer conductor.

In at least one embodiment, a central axis of the at least one linear actuator can be coaxial with the longitudinal axis of the inner conductor.

In at least one embodiment, the linear actuator can include an actuator housing and a piston therein.

In at least one embodiment, the actuator housing can be longitudinally adjacent to the first end of the inner conductor, and the piston can be coupled to the first end of the inner conductor.

In at least one embodiment, the coaxial transmission line can include a support assembly for positioning the actuator housing longitudinally adjacent to the inner conductor and the outer conductor.

In at least one embodiment, the support assembly can position the actuator housing at a distance from the inner conductor to allow the piston to extend out of the actuator housing.

In at least one embodiment, the actuator housing can abut a support member of the support assembly.

In at least one embodiment, the support member can be non-conductive.

In at least one embodiment, the actuator housing can be coupled to the outer conductor, the first end of the inner conductor can extend into the actuator housing, and the piston can be coupled to the inner conductor within the actuator housing.

In at least one embodiment, the at least one linear actuator can be automatically adjusted to obtain a target tension of the inner conductor.

In at least one embodiment, the at least one linear actuator can include one of a hydraulic actuator or a pneumatic actuator; and the coaxial transmission line can further include at least one pressure control valve and an accumulator for automatically adjusting the at least one linear actuator.

In at least one embodiment, the coaxial transmission line can include one or more sensors for detecting a load on the at least one linear actuator, and the tension force applied by the at least one linear actuator can be adjusted based at least in part on the load detected by the one or more sensors.

In at least one embodiment, the one or more sensors can include at least one of a load cell or a pressure transmitter.

In at least one embodiment, at least a portion of the longitudinal axis can be non-linear.

In another broad aspect, a method of providing a coaxial transmission line is disclosed. The method involves providing an inner conductor having a longitudinal axis and extending from a first end to a second end; fixing the second end of the inner conductor to an electromagnetic load; providing an outer conductor that surrounds the inner conductor; coupling at least one linear actuator to the inner conductor at the first end; and actuating the at least one linear actuator to apply a tension force to the inner conductor.

In at least one embodiment, actuating the at least one linear actuator to apply a tension force to the inner conductor can involve using a gas actuation system to actuate the at least one linear actuator.

In at least one embodiment, actuating the at least one linear actuator to apply a tension force to the inner conductor can involve using a dielectric fluid insulator for isolating the inner conductor from the outer conductor and actuating the at least one linear actuator.

In at least one embodiment, coupling the at least one linear actuator to the inner conductor can involve coupling a plurality of linear actuators circumferentially around the longitudinal axis of the inner conductor at the first end.

In at least one embodiment, coupling the plurality of linear actuators circumferentially around the longitudinal axis of the inner conductor at the first end can involve positioning the plurality of linear actuators around at least part of the inner conductor at the first end.

In at least one embodiment, coupling the plurality of linear actuators to the inner conductor at the first end can involve coupling a crosshead to the inner conductor, and coupling each of the plurality of linear actuators to the crosshead.

In at least one embodiment, each of the plurality of linear actuators can include an actuator housing and a piston therein.

In at least one embodiment, the plurality of actuator housings can be coupled to the outer conductor.

In at least one embodiment, a central axis of the at least one linear actuator can be coaxial with the longitudinal axis of the inner conductor.

In at least one embodiment, the linear actuator can include an actuator housing and a piston therein.

In at least one embodiment, coupling the linear actuator to the inner conductor can involve positioning the actuator housing longitudinally adjacent to the first end of the inner conductor and coupling the piston to the first end of the inner conductor.

In at least one embodiment, positioning the actuator housing longitudinally adjacent to the inner conductor and the outer conductor can involve positioning the actuator housing at a distance from the inner conductor that allows the piston to extend out of the actuator housing.

In at least one embodiment, coupling the linear actuator to the inner conductor can involve coupling the actuator housing to the outer conductor, routing at least the first end of the inner conductor in the actuator housing, and engaging the inner conductor with the piston.

In at least one embodiment, the method can further involve automatically adjusting the actuation of the at least one linear actuator to a target tension.

In at least one embodiment, the at least one linear actuator can include one of a hydraulic actuator or a pneumatic actuator, and automatically adjusting the actuation of the at least one linear actuator to a target tension can involve operating at least one pressure control valve to allow receipt or release of fluid or gas to and from an accumulator.

In at least one embodiment, automatically adjusting the actuation of the at least one linear actuator to the target tension can involve detecting a load on the at least one linear actuator, and adjusting the actuation of the at least one linear actuator based at least in part on the load detected.

In at least one embodiment, detecting the load on the at least one linear actuator can involve detecting the load using at least one of a load cell or a pressure transmitter.

In another broad aspect, a system for electromagnetic heating of an underground hydrocarbon formation positioned below a ground surface is disclosed. The system includes an electrical power source; at least one electromagnetic wave generator for generating alternating current, at least one applicator positioned in the hydrocarbon formation; and at least one coaxial transmission line for carrying the alternating current from the at least one electromagnetic wave generator to the applicator. The at least one electromagnetic wave generator is powered by the electrical power source. The applicator is coupled at a proximal end to the at least one electromagnetic wave generator. The applicator being excitable by the alternating current for electromagnetically heating the hydrocarbon formation. Each coaxial transmission line includes an inner conductor having a longitudinal axis and extending from a proximal end to a distal end; an outer conductor surrounding the inner conductor along the longitudinal axis; and at least one linear actuator coupled to the inner conductor at the proximal end for applying a tension force to the inner conductor. The distal end of each inner conductor is fixed to the at least one applicator. The proximal end of each inner conductor is connected to the at least one electromagnetic wave generator.

In at least one embodiment, the at least one linear actuator can be located at or above the ground surface.

In another broad aspect, a method of delivering power to an electromagnetic load through a coaxial transmission line is disclosed. The coaxial transmission line has an inner conductor and an outer conductor. The method involves routing the inner conductor through an internal passage of the outer conductor. The inner conductor has an inner conductor first end and an opposed inner conductor second end. The outer conductor has an outer conductor first end and an opposed outer conductor second end. The internal passage extends between the outer conductor first and second ends. The method further involves electrically coupling i) the inner conductor second end to the electromagnetic load, and ii) the inner conductor first end to an electrical power source; delivering power to the electromagnetic load through the coaxial transmission line; and applying a tension force on the inner conductor first end to mitigate deflection of the inner conductor within the internal passage.

It will be appreciated that the aspects and embodiments may be used in any combination or sub-combination. Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
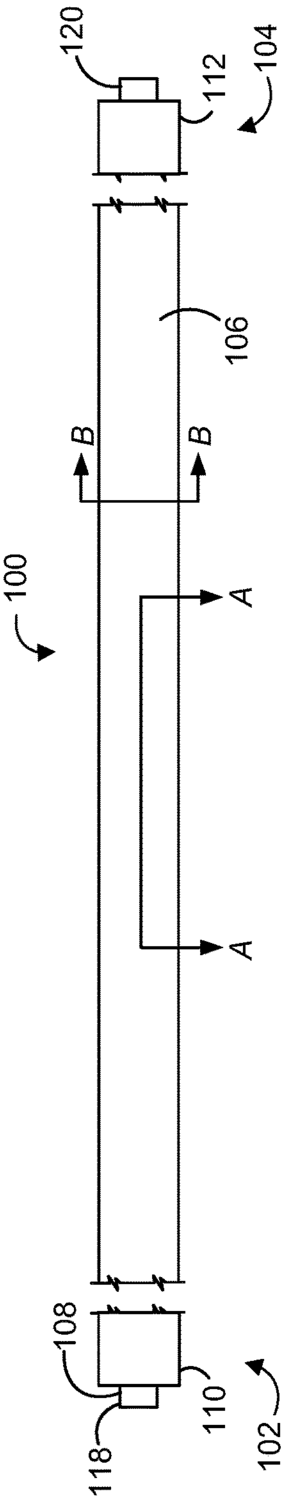
FIG. 1A is a side view of an example coaxial transmission line.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The terms "an embodiment", "embodiment", "embodiments", "the embodiment", "the embodiments", "one or more embodiments", "some embodiments", and "one embodiment" mean "one or more (but not all) embodiments of the present invention(s)", unless expressly specified otherwise.

The terms "including", "comprising" and variations thereof mean "including but not limited to", unless expressly specified otherwise. A listing of items does not imply that any or all of the items are mutually exclusive, unless expressly specified otherwise. The terms "a", "an" and "the" mean "one or more", unless expressly specified otherwise.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "afFixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

A description of an embodiment with several components in communication with each other does not imply that all such components are required. On the contrary a variety of optional components are described to illustrate the wide variety of possible embodiments described herein.

As used herein and in the claims, a first element is said to be 'communicatively coupled to' or 'communicatively connected to' or 'connected in communication with' a second element where the first element is configured to send or receive electronic signals (e.g., data) to or from the second element, and the second element is configured to receive or send the electronic signals from or to the first element. The communication may be wired (e.g., the first and second elements are connected by one or more data cables), or wireless (e.g., at least one of the first and second elements has a wireless transmitter, and at least the other of the first and second elements has a wireless receiver). The electronic signals may be analog or digital. The communication may be one-way or two-way. In some cases, the communication may conform to one or more standard protocols (e.g., SPI, $I^2C$, Bluetooth™, or IEEE™ 802.11).

As used herein and in the claims, a group of elements are said to 'collectively' perform an act where that act is performed by any one of the elements in the group, or performed cooperatively by two or more (or all) elements in the group.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Some elements herein may be identified by a part number, which is composed of a base number followed by an alphabetical or subscript-numerical suffix (e.g., 112*a*, or $\mathbf{112}_1$). Multiple elements herein may be identified by part numbers that share a base number in common and that differ by their suffixes (e.g., $\mathbf{112}_1$, $\mathbf{112}_2$, and $\mathbf{112}_3$). All elements with a common base number may be referred to collectively or generically using the base number without a suffix (e.g., 112).

As used herein, the term "radio frequency" may extend beyond the conventional meaning of radio frequency. As used herein, the term "radio frequency" generally includes frequencies at which the physical dimensions of system components are comparable to the wavelength of the EM wave. System components that are between approximately 1/16 of a wavelength to 10 wavelengths can be considered comparable to the wavelength. For example, a 1 kilometer (km) long underground system that uses EM energy to heat underground formations and operates at 50 kilohertz (kHz) will have physical dimensions that are comparable to the wavelength. If the underground formation has significant water content, (e.g., relative electrical permittivity being approximately 60 and conductivity being approximately 0.002 S/m), the EM wavelength at 50 kHz is 303 meters. The length of the 1 km long radiator is approximately 3.3 wavelengths. If the underground formation is dry (e.g., relative electrical permittivity being approximately 6 and conductivity being approximately 3E-7 S/m), the EM wavelength at 50 kHz is 2450 meters. The length of the radiator is then approximately 0.4 wavelengths. Therefore, in both wet and dry scenarios, the length of the radiator is considered comparable to the wavelength in the context of the disclosure herein. Accordingly, effects typically seen in conventional radio-frequency (RF) systems will be present and while a frequency of 50 kHz is not typically considered an RF frequency, in the disclosure herein such a system may be considered to be an RF system.

Reference is now made FIG. 1A to FIG. 1D, which show a coaxial transmission line, referred to generally as 100. Coaxial transmission line 100 can be used to carry high-frequency electrical signals with low losses. It can be used in a wide variety of applications, such as, for example, communications, radar, electronic and industrial applications. In some cases, coaxial transmission line 100 can be used to deliver radio frequency (RF) power to an electromagnetic load, such as an electromagnetic (EM) radiator, antenna, application, lossy transmission line, or any other device that requires radio frequency power to operate. While the term electromagnetic load is used herein, it will be understood that the electromagnetic load can be an electrical load.

As shown in FIG. 1, coaxial transmission line 100 extends between first and second line ends 102, 104. First line end 102 can be electrically coupled to a power source, directly or indirectly. Second line end 104 can be electrically coupled to an electromagnetic load, directly or indirectly. First and second line ends 102, 104 can be electrically coupled to the power source and the electromagnetic load in any suitable manner. It will be appreciated that the length of coaxial transmission line 100 can vary across applications.

Figure 1B:
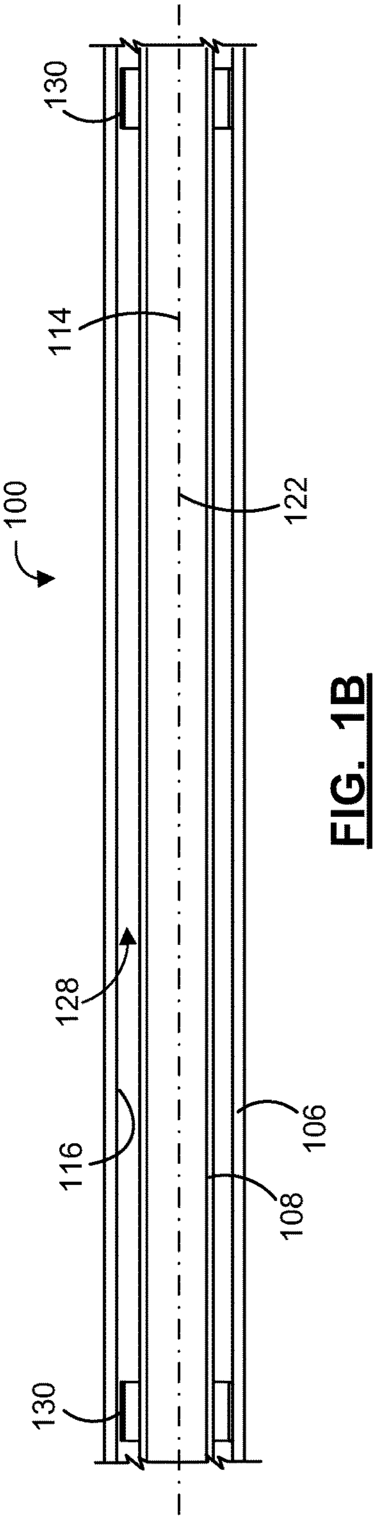
FIG. 1B is a cross-sectional view taken along line A-A in FIG. 1A, with an inner conductor of the coaxial transmission line in a non-deflected state.

With reference to FIG. 1A and FIG. 1B, coaxial transmission line 100 includes an outer conductor 106 and an inner conductor 108. Outer conductor 106 extends from an outer conductor first end 110 to an outer conductor second end 112 along an outer conductor central axis 114 (also referred to as "outer conductor longitudinal axis 114"). Outer conductor 106 has an internal passage 116 that extends between outer conductor first end 110 and outer conductor second end 112.

Inner conductor 108 extends from an inner conductor first end 118 to an inner conductor second end 120 along an inner conductor central axis 122 (also referred to as "inner conductor longitudinal axis 122"). Inner conductor 108 is positioned within internal passage 116 of outer conductor 106. Accordingly, inner conductor 108 is surrounded by the outer conductor 106 along the inner conductor central axis 122.

In at least one embodiment, outer conductor 106 of coaxial transmission line 100 can be a conductive pipe. The conductive pipe can be made of a conductive metal (e.g., copper, iron, etc.) or another suitable conductive material. In some embodiments, outer conductor 106 can be a metal casing pipe. In at least one embodiment, inner conductor 108 can be a pipe, cable, wire, or conductor rod that is passed through the outer conductive pipe.

In some embodiments, such as the example shown in FIG. 1A, inner conductor first end 118 and inner conductor second end 120 can extend outwardly from outer conductor first end 110 and outer conductor second end 112, respectively (i.e., inner conductor 108 is longer than outer conductor 106). This configuration can facilitate coupling of inner conductor first end 118 to a power source (e.g., a power cable) and/or inner conductor second end 120 to an electromagnetic load (e.g., an EM radiator). In other embodiments, either or both of the inner conductor first and second ends 118, 120 can be flush with corresponding outer conductor first and second ends 110, 112 (i.e., outer and inner conductors 106, 108 may have the same length). Alternatively, outer conductor first end 110 and outer conductor second end 112 can extend outwardly from inner conductor first end 118 and inner conductor second end 120, respectively (i.e., outer conductor 106 may be longer than inner conductor 108). In this configuration, outer conductor first and second ends 110, 112 may protect (e.g., shield) corresponding inner conductor first and second ends 118, 120 from damage and/or exposure to the surrounding environment. Other configurations are possible.

Figure 1C:
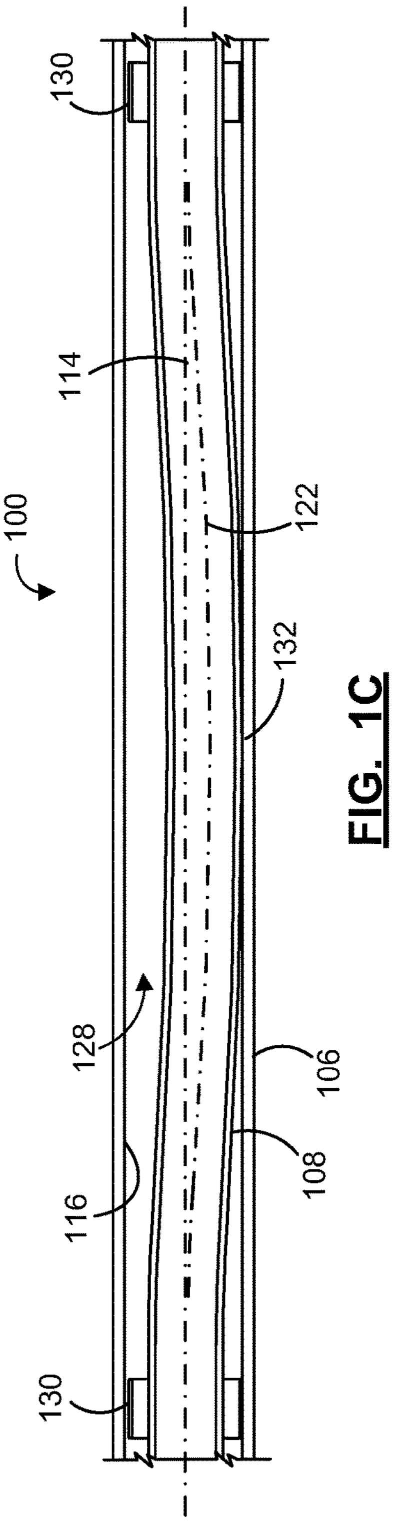
FIG. 1C is a cross-sectional view taken along line A-A in FIG. 1A, with the inner conductor in a deflected state.
Figure 1D:
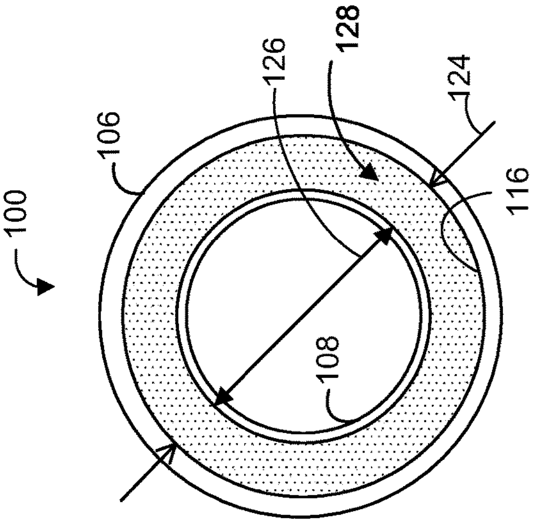
FIG. 1D is a cross-sectional view taken along line B-B in FIG. 1A.

Referring to FIG. 1B and FIG. 1D, inner conductor 108 extends through internal passage 116 of outer conductor 106 without making physical contact with outer conductor 106. The physical separation of outer and inner conductors 106, 108 along the length of coaxial transmission line 100 acts to electrically isolate outer and inner conductors 106, 108 from each other. In some cases, contact between outer and inner conductors 106, 108 can cause a short circuit at the point of contact. In other cases, simply bringing outer and inner conductors 106, 108 into close proximity (even without physical contact) can lead to arcing (i.e., effectively a short circuit). In either of these cases, the short circuit may cause burns, fires and/or permanent damage to coaxial transmission line 100.

Referring to FIG. 1D, outer conductor 106 has an internal cross-sectional diameter 124. Inner conductor 108 has an outer cross-sectional diameter 126. As shown, outer diameter 126 of inner conductor 108 is smaller than internal diameter 124 of outer conductor 106. Accordingly, an annular cavity 128 is defined between outer and inner conductors 106, 108 along the length of coaxial transmission line 100. It is desirable for annular cavity 128 to be substantially uniform along the length of coaxial transmission line 100. Non-uniformity of annular cavity 128 along the length of coaxial transmission line 100 can lead to field concentration effects, changes in the characteristic impedance of the coaxial transmission line, and formation of reactances causing wave reflections, potential shorting, and arcing in high power applications. In some embodiments, such as the example shown in FIG. 1B and FIG. 1D, outer and inner conductors 106, 108 can be concentric. That is, outer conductor central axis 114 and inner conductor central axis 122 can be coincident (see e.g., FIG. 1B). In other embodiments, outer and inner conductors 106, 108 may not be concentric.

Physical separation between outer and inner conductors 106, 108 along the length of coaxial transmission line 100 can be maintained in any suitable manner. For example, an insulating (dielectric) material may be provided in annular cavity 128 between outer and inner conductors 106, 108. The insulating material may be solid plastic (e.g., solid polyethylene), foam plastic (e.g., polyethylene foam), rubber, or air with spacers supporting the inner wire. Alternatively, or in addition, a dielectric fluid insulator (e.g., electronegative gas and/or liquid) can be sealed or circulated with annular cavity 128 to increase power transmission and/or maintain physical separation between outer and inner conductors 106, 108.

In some embodiments, such as the example shown in FIG. 1B, centralizers 130 can be located along inner conductor 108 in annular cavity 128 to maintain the physical separation of outer and inner conductors 106, 108. Centralizers 130 are annular (i.e., ring-shaped) and have an internal diameter slightly larger than outer diameter 126 of inner conductor 108, thereby allowing them to fit around inner conductor 108. Multiple centralizers 130 can be distributed at an interval (regular or irregular) along inner conductor 108. FIG. 1B shows two centralizers 130 separated at an interval. Centralizers 130 can be made of any suitable non-conductive material. In some embodiments, centralizers 130 can align the inner conductor central axis 122 with the outer conductor central axis 114 such that they are coincident.

Installation of centralizers 130 can involve sliding each centralizer 130 along inner conductor 108 or routing inner conductor 108 through internal passage 116 of outer conductor 106 with centralizers 130 pre-mounted to inner conductor 108. Mechanical fasteners and/or adhesives can be used to mount each centralizer 130 to the exterior surface of inner conductor 108. In other embodiments, centralizers 130 may be mounted to the internal surface of outer conductor 106 in a similar fashion.

FIG. 1B shows inner conductor 108 in a non-deflected state. In the non-deflected state, inner conductor 108 does not deflect within internal passage 116. As shown, inner conductor central axis 122 and outer conductor central axis 114 run parallel to each other along the length of coaxial transmission line 100 (in the example shown in FIG. 1B, inner conductor central axis 122 and outer conductor central axis 114 are parallel and coincident). In the non-deflected state, outer and inner conductors 106, 108 are electrically isolated from one another by their physical separation.

Conversely, FIG. 1C shows inner conductor 108 in a deflected state. In the deflected state, inner conductor 108 deflects (e.g., bends, buckles) within internal passage 116. As shown, inner conductor central axis 122 and outer conductor central axis 114 do not run parallel to each other between centralizers 130. Owning to the deflection of inner conductor 108, outer and inner conductors 106, 108 touch at contact region 132. As described above, physical contact between outer and inner conductors 106, 108 can cause a short circuit. In some cases, even small deflections of inner conductor 108 within internal passage 116 can bring outer and inner conductors 106, 108 close enough to cause arcing (i.e., effectively a short circuit). Short circuits and/or arcing can cause severe burns, fires and/or permanent damage to coaxial transmission line 100.

Deflection of inner conductor 108 within internal passage 116 can be caused by one or more factors. For example, during operation, inner conductor 108 may heat up more than outer conductor 106. This may lead to differential thermal expansion between outer and inner conductors 106, 108, with inner conductor 108 expanding more than outer conductor 106. With reference to FIG. 1C, this differential thermal expansion can lead to buckling of inner conductor 108 between centralizers 130. In embodiments where coaxial transmission line 100 runs horizontally (or has a horizontal component), gravity may cause inner conductor 108 to buckle within internal passage 116. In other embodiments, two or more factors may combine to cause deflection of inner conductor 108.

Figure 2A:
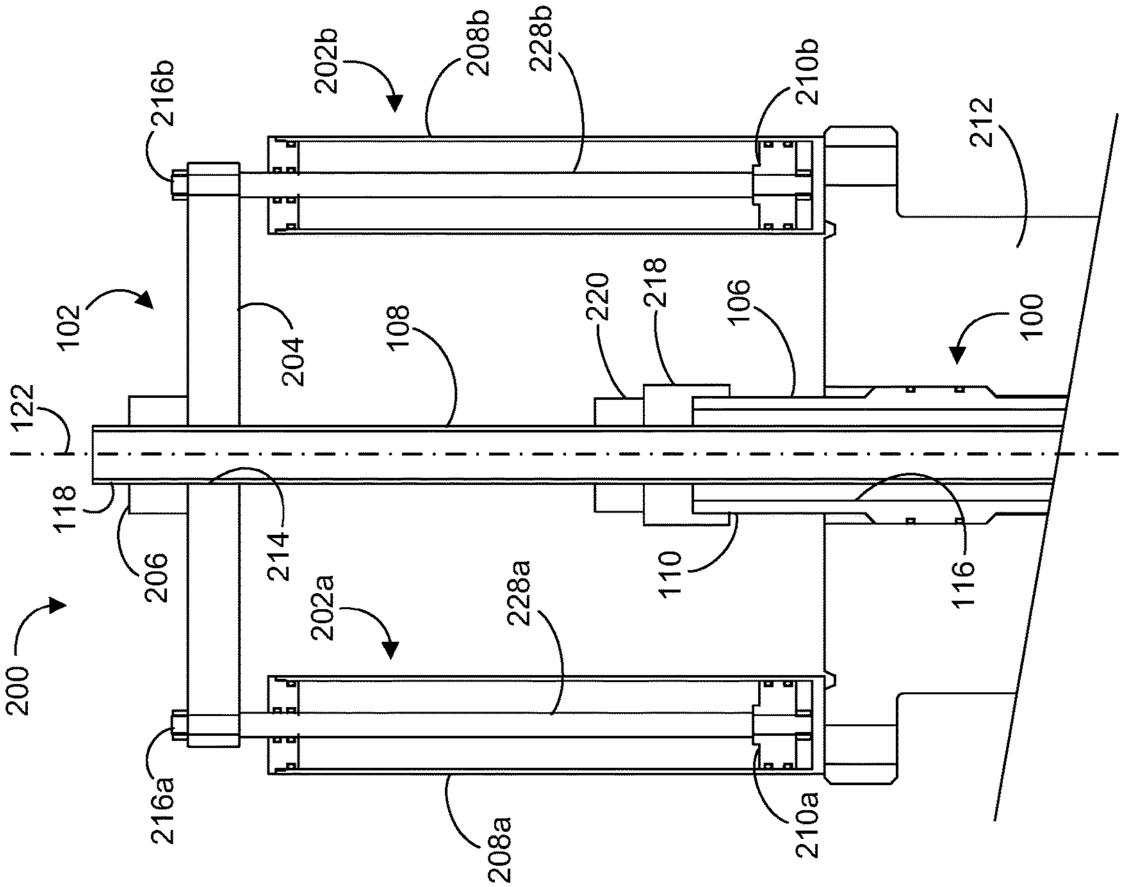
FIG. 2A is a partial cutaway view of an example power transmission apparatus, including an example tensioning device connected to the coaxial transmission line of FIG. 1A.

Reference is now made to FIG. 2A, which shows an example tensioning device 200 coupled to coaxial transmission line 100 at first line end 102. As will be described in more detail below, tensioning device 200 acts to apply a tension force to inner conductor 108 at inner conductor first end 118. The applied tension force can limit or prevent deflection of inner conductor 108 within internal passage 116, thereby reducing the occurrence of a short circuit along coaxial transmission line 100. Stated differently, the applied tension force can limit or eliminate deflection of inner conductor 108 in a direction transverse to the outer conductor central axis 114. An example of this type of unwanted deflection is shown in FIG. 1C between adjacent centralizers 130. In some embodiments, the applied tension force keeps the inner conductor central axis 122 substantially parallel with the outer conductor central axis 114 over the length of coaxial transmission line 100. During operation, the tension force can be applied continuously on inner conductor first end 118 by tensioning device 200.

In a coaxial transmission line 100 where centralizers 130 (FIG. 1B) are distributed along annular cavity 128 to maintain the physical separation of outer and inner conductors 106, 108, the applied tension acts to limit or prevent deflection of inner conductor 108 within internal passage 116 between adjacent centralizers 130. In some embodiments, the applied tension force by the tensioning device 200 is greater than a weight of inner conductor 108. This has the effect of tensioning inner conductor 108 over its entire length, allowing inner conductor 108 to expand axially without deflecting laterally (i.e., toward outer conductor 106).

Tensioning device 200 includes a pair of parallel linear actuators 202*a*, 202*b* (collectively referred to as linear actuators 202) and a non-conductive coupling element that includes a crosshead 204 and a clamp 206. As will be described in more detail below, crosshead 204 and clamp 206 couple each of the linear actuators 202*a*, 202*b* to inner conductor first end 118. In some embodiments, such as the example shown in FIG. 2A, inner conductor first end 118 can extend outwardly from outer conductor first end 110. This can facilitate the coupling of each linear actuator 202*a*, 202*b* to inner conductor first end 118 via the crosshead 204 and clamp 206. Crosshead 204 and clamp 206 are preferably non-conductive to maintain electrical isolation of the inner conductor 108 from the outer conductor 106. In some embodiments, crosshead 204 and/or clamp 206 can be made of, or formed from a non-conductive material (e.g., a hard plastic). In other embodiments, crosshead 204 and/or clamp 206 can be coated with a non-conductive material.

In some embodiments, each of the linear actuators 202*a*, 202*b* are hydraulic actuators, electromagnetic actuators, or pneumatic actuators. Having each linear actuator 202*a*, 202*b* be of the same type or model may simplify operation and/or installation. In other embodiments, a plurality of linear actuators 202 may include a combination of hydraulic actuators, electromagnetic actuators and pneumatic actuators (e.g., one hydraulic actuator and one electromagnetic actuator).

As shown in FIG. 2A, a central axis of each linear actuator(s) 202*a*, 202*b* is parallel to the inner conductor central axis 122 at inner conductor first end 118. In some embodiments, such as the example shown in FIG. 2A, each of the linear actuators 202*a*, 202*b* can be substantially equally spaced from coaxial transmission line 100. That is, the distance between the central axis of each linear actuator(s) 202*a*, 202*b* to the inner conductor central axis 122 is substantially equal. This may simplify operation and installation. Alternatively, the linear actuators 202*a*, 202*b* may be unevenly spaced from coaxial transmission line 100.

In other embodiments, any number of linear actuators 202 may be provided (e.g., 3 to 8 in total). In such embodiments, the plurality of linear actuators 202 can be positioned circumferentially around inner conductor central axis 122 at the inner conductor first end 118.

Such a configuration with the central axis of the linear actuator(s) 202*a*, 202*b* being parallel to the inner conductor central axis 122 can provide clearance for accessing the inner conductor 108. In addition, in the case of hydraulic actuators, this configuration can reduce the risk of fluid from actuator housing(s) leaking into the coaxial transmission line 100.

In some embodiments, such as the example shown in FIG. 2A, each linear actuator 202*a*, 202*b* can include an actuator housing 208*a*, 208*b* (collectively referred to as actuator housings 208) and a piston 210*a*, 210*b* (collectively referred to as pistons 210). The actuator housings 208 can be cylinders. Each piston 210*a*, 210*b* includes a respective piston rod 228*a*, 228*b* (collectively referred to as piston rods 228) that is rigidly coupled to the piston 210*a*, 210*b*. Each piston 210*a*, 210*b* is movable with respect to actuator housing 208*a*, 208*b*.

Actuator housings 208 can be seated on any suitable support. In some embodiments, such as the example shown in FIG. 2A, actuator housings 208 can be seated on a wellhead 212. Accordingly, linear actuators 202*a*, 202*b* can be made of a non-magnetic metal (e.g., stainless steel) to control energy losses (e.g., eddy current). Optionally, wellhead 212 can be grounded to the power source. In some cases, multiple tensioning devices 200 may be seated on a single wellhead 212. In some embodiments, actuator housings 208 are mechanically fastened to wellhead 212 and/or outer conductor 106, such as the outer conductor first end 110, to improve stability. Other configurations are possible.

Referring still to FIG. 2A, crosshead 204 includes a central internal bore 214. Crosshead 204 can be coupled with inner conductor first end 118, by inserting inner conductor first end 118 through internal bore 214 and applying clamp 206. Clamp 206 prevents inner conductor first end 118 from passing back through internal bore 214 of crosshead 204. Other mechanical fasteners may be used in conjunction with or instead of clamp 206.

The piston rod 228*a*, 228*b* of each linear actuator 202*a*, 202*b* is rigidly coupled to crosshead 204. Each piston rod 228*a*, 228*b* can be rigidly coupled to crosshead 204 in any suitable manner. In some embodiments, such as the example shown in FIG. 2A, each piston rod 228*a*, 228*b* extends through the crosshead 204 and a mechanical fastener, such as nut 216*a*, 216*b* (collectively referred to as nuts 216), can be used to couple an end of each piston rod 228*a*, 228*b* to crosshead 204. Accordingly, movement of pistons 210 concurrently moves crosshead 204, which, in response, adjusts the tension force applied to inner conductor first end 118. In some embodiments, washers can also be provided on the top and/or the bottom of the crosshead 204 to distribute the load.

The tension force applied to inner conductor first end 118 can be varied according to the actuation of pistons 210 (i.e., movement of pistons 210 in and out of their actuator housings 208). Crosshead 204 applies a tension force to inner conductor first end 118 that is positively correlated to the degree to which pistons 210 extend from their actuator housings 208. That is, as pistons 210 extend farther from their actuator housings 208, the tension force applied by crosshead 204 to inner conductor first end 118 increases. For example, FIG. 2A shows pistons 210 almost fully retracted in their corresponding actuator housings 208. In this position, crosshead 204 applies a relatively low tension force to inner conductor first end 118. If pistons 210 were to extend from their positions shown in FIG. 2A (i.e., extend out of actuator housings 208), the tension force applied to inner conductor first end 118 by linear actuators 202 increases.

In some embodiments, such as the example shown in FIG. 2A, a non-conductive stabilizer 218 can be positioned at outer conductor first end 110. Stabilizer 218 can maintain the physical separation between outer and inner conductors 106, 108 at outer conductor first end 110. By physically separating outer and inner conductors 106, 108, stabilizer 218 can act to keep outer and inner conductors 106, 108 electrically isolated from one another. In some cases, stabilizer 218 may prevent outer and inner conductors 106, 108 from coming into contact due to unequal activation of linear actuators 202. In embodiments where a dielectric fluid insulator is circulated within annular cavity 128, stabilizer 218 can act as an annular cavity seal at outer conductor first end 110. In this manner, stabilizer 218 can impede or prevent escape of the dielectric fluid insulator from annular cavity 128 into the surrounding environment. In the embodiment shown, stabilizer 218 is threaded onto the outer conductor 106 at the outer conductor first end 110. Other configurations are possible.

Assembly ring 220 can be used during installation of the inner conductor 108. During installation of the inner conductor 108, a pre-tension is applied to the inner conductor 108. Assembly ring 220 maintains the pre-tension on the inner conductor 108 until the tensioning device 200 is installed. In some embodiments, assembly ring 220 can be an assembly clamp.

In some embodiments, linear actuators 202 include an electronic control device. Each linear actuator 202*a*, 202*b* may have its own electronic control device. Alternatively, a single electronic control device may be configured to control the operation of multiple linear actuators 202.

In some embodiments, linear actuators 202 can be actuated by a gas actuation system. Actuator housings 208 can include a gas port (not shown in FIG. 2A). Actuator housings 208 can be pressurized by introducing gas via the gas port. The internal gas pressure within actuator housings 208 actuates pistons 210. Increasing the internal gas pressure moves pistons 210 away from outer conductor first end 110 and thereby increases the tension force it applies to inner conductor first end 118. Accordingly, gas can be introduced into actuator housings 208 via the gas port to increase the applied tension force. Conversely, decreasing the internal gas pressure moves pistons 210 toward outer conductor first end 110 and thereby decreases the tension force it applies to inner conductor first end 118.

As described above, a dielectric fluid insulator can be sealed or circulated within annular cavity 128 of coaxial transmission line 100 to increase power transmission and/or maintain the electrical isolation of outer and inner conductors 106, 108. In some embodiments, a dielectric fluid system used for circulating dielectric fluid within coaxial transmission line 100 can also be used to actuate linear actuators 202. In other embodiments, a gas actuation system that is separate from the dielectric fluid system can be provided to actuate linear actuators 202. While a separate gas actuation system involves additional control and instrumentation components, thereby increasing complexity, it may improve the overall reliability of the coaxial transmission line 100 as failure of the gas actuation system does not also result in failure of the dielectric fluid system and vice versa.

Figure 2B:
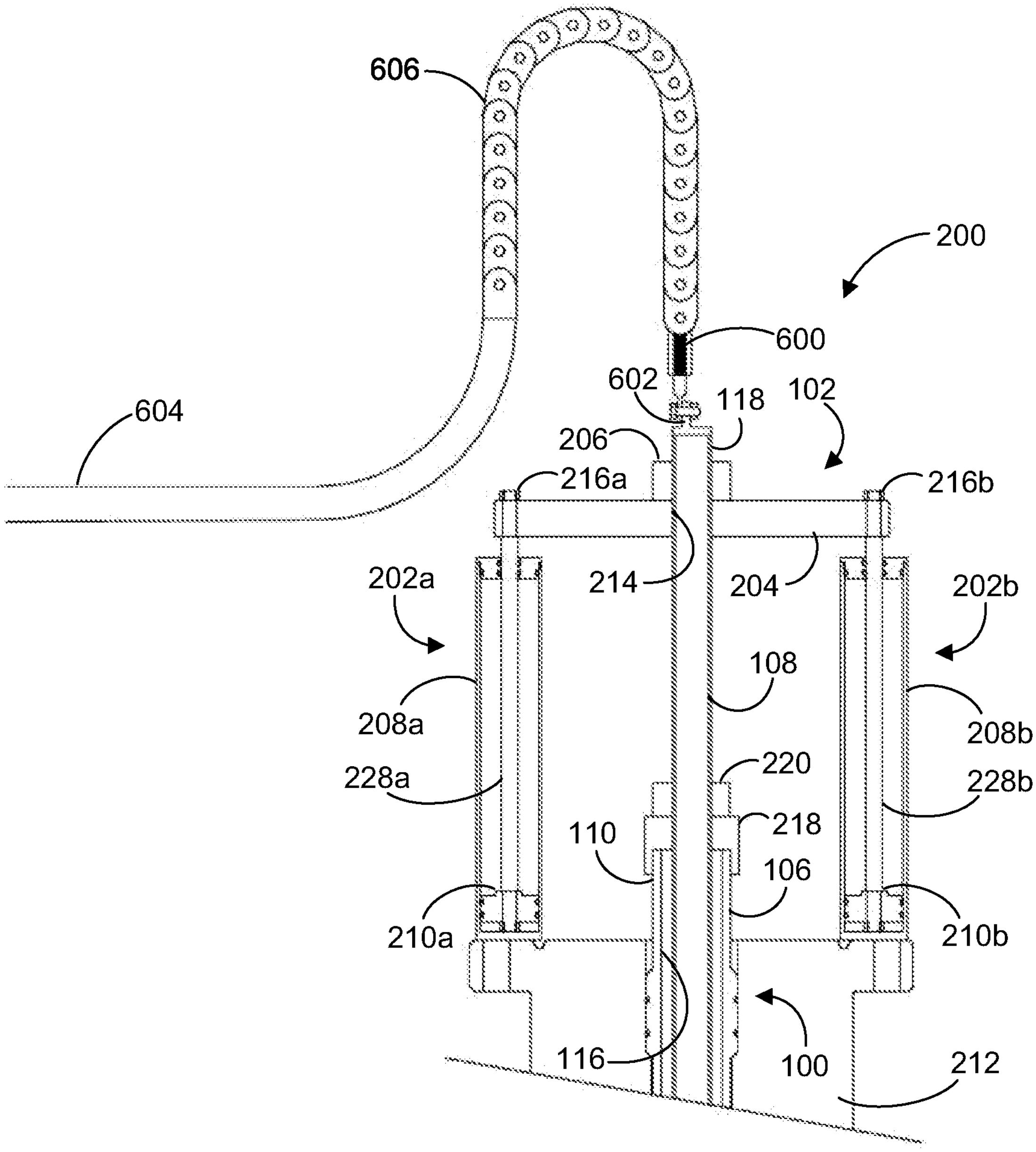
FIG. 2B is the partial cutaway view of FIG. 2A, with a power source electrically coupled to the inner conductor.

Inner conductor first end 118 can be electrically coupled to a power source in any suitable manner. For example, FIG. 2B shows inner conductor first end 118 electrically coupled to a power cable 600 by a latch 602. In the embodiment shown, power cable 600 is routed through a cable tray 604 and cable carrier 606 before being coupled to latch 602. Cable carrier 606 can accommodate movement of the power cable 602 in the vertical direction. Cable tray 604 can secure and support power cable 602, reduce wear and stress on power cable 602, prevent entanglement, and improve operator safety. Cable tray 604 and/or cable carrier 606 may be made of a non-magnetic metal (e.g., aluminum, tin, copper, etc.) or a non-metallic material (e.g., plastic) to control eddy current losses. Tensioning device 200, cable tray 604, and/or power cable 602, or portions thereof can be located in an enclosure for shelter and protection from the environment.

Figure 3A:
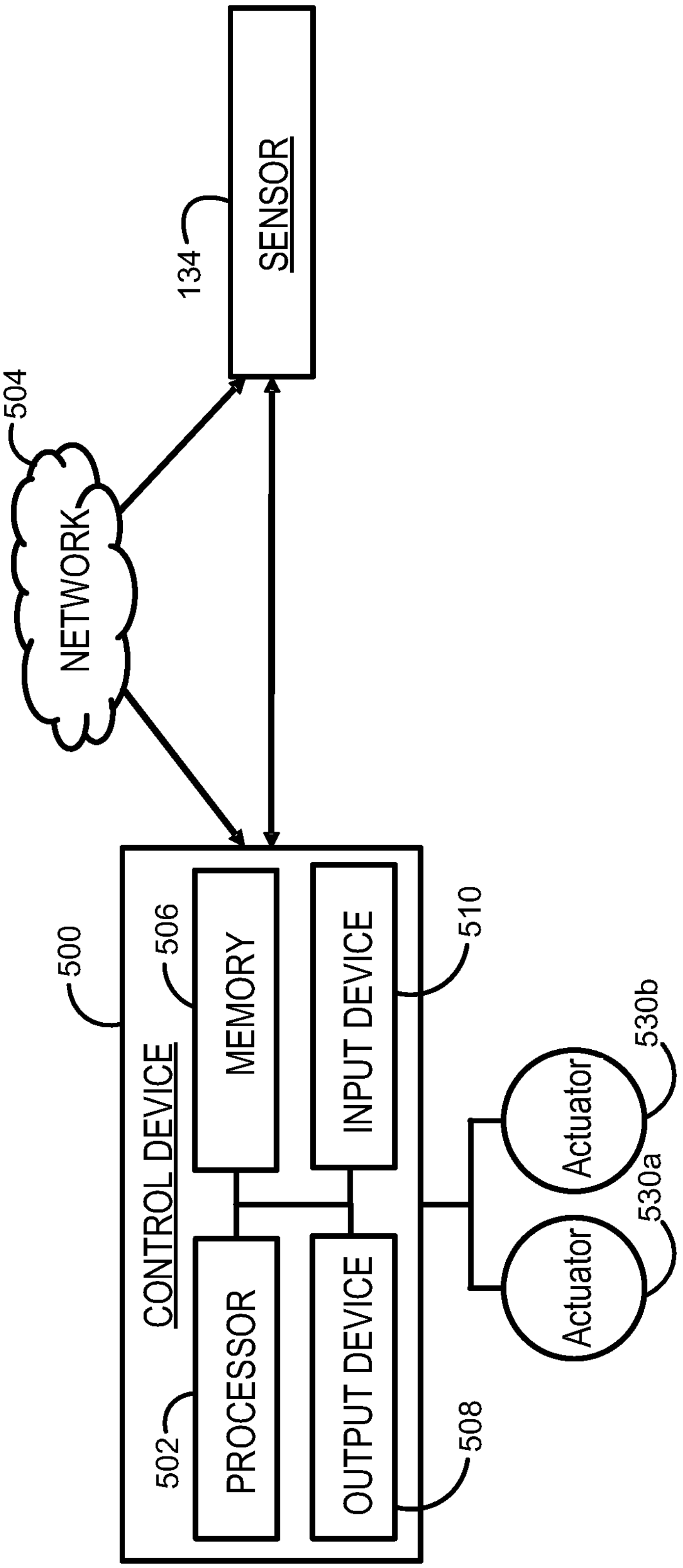
FIG. 3A is a schematic illustration of an electronic control device of the power transmission apparatus of FIG. 2A communicatively coupled to a load sensor.

Reference is now made to FIG. 3A, which shows a schematic illustration of an example electronic control device 500 of linear actuator(s) 530*a*, 530*b* (collectively referred to as linear actuators 530). Linear actuators 530 can be for example, linear actuators 202 of FIG. 2A, linear actuator 302 of FIG. 5, or linear actuator 402 of FIG. 7. The electronic control device can 500 include an electronic controller, such as processor 502, one or more inputs (e.g., user inputs) and one or more outputs (e.g., relays, valves, or switches) that are communicatively coupled to electronic controller 502 and operated by control signals from electronic controller 502. Electronic controller 502 can control the operation of linear actuator(s) 530. In some cases, electronic controller 502 is responsive to inputs from, e.g., user inputs located on the linear actuator(s) 530. For example, a user may manipulate user inputs to adjust the operation of linear actuator(s) 530 (e.g., adjust the tension force that is applied to inner conductor first end 118).

The electronic control device may be located remote from linear actuators 530. In at least one embodiment, linear actuator(s) 530 can be communicatively connected to electronic control device 500 to allow electronic control device 500 to communicate and/or relay signals with linear actuator(s) 530. As shown, electronic control device 500 may include a connection with a network 504 such as a wired or wireless connection to the Internet or to a private network. In some cases, network 504 includes other types of computer or telecommunication networks (e.g., wireless access network, Bluetooth®, etc.).

In the embodiment shown, electronic control device 500 includes a processor 502, a memory 506, an output device 508, and an input device 510. Each of memory 506, output device 508, and input device 510 are communicatively coupled to processor 502, directly or indirectly. In some embodiments, electronic control device 500 includes multiple of any one or more of processor 502, memory 506, output device 508, and input device 510. In some embodiments, electronic control device 500 does not include one or more of network connections, memory 506, output devices 508, and input devices 510. For example, electronic control device 500 may not include output device 508, and/or may not include input device 510. Furthermore, output device 508 and input device 510 can be integrated into a single device.

In some embodiments, electronic control device 500 is a single, unitary device that houses all of its subcomponents (processor 502, memory 506, etc.). In other embodiments, electronic control device 500 is composed of two or more discrete subdevices that are communicatively coupled to each other, that collectively include all of the subcomponents of electronic control device 500 (processor 502, memory 506, etc.), and that collectively provide the functionality described herein.

The processor 502 may be any suitable processors, controllers, digital signal processors, graphics processing units, application specific integrated circuits (ASICs), and/or field programmable gate arrays (FPGAs) that can provide sufficient processing power depending on the configuration, purposes and requirements of the electronic control device 500. In some embodiments, the processor 502 can include more than one processor with each processor being configured to perform different dedicated tasks.

The processor 502 may be configured to control the operation of the linear actuator(s) 530. The processor 502 can include modules that initiate and manage the operations of the linear actuator(s) 530. The processor 502 may also determine, based on received data, stored data and/or user preferences, how the linear actuator(s) 530 may generally operate.

Generally, processor 502 can execute computer readable instructions (also referred to as applications or programs). The computer readable instructions can be stored in memory 506. When executed, the computer readable instructions can configure processor 502 (or multiple processors 502, collectively) to perform the acts described herein with reference to linear actuator(s) 530, for example.

Memory 506 can include random access memory (RAM), read only memory (ROM), one or more hard drives, one or more flash drives or some other suitable data storage elements such as disk drives, etc. Also, in some embodiments, memory 506 stores one or more applications for execution by processor 502. Applications correspond with software modules including computer executable instructions to perform processing for the functions and methods described below. The applications include various user programs so that a user can interact with the processor 502 to perform various functions such as, but not limited to, controlling linear actuator(s) 530. In some embodiments, some or all of memory 506 may be integrated with processor 502. For example, processor 502 may be a microcontroller (e.g., Microchip™ AVR, Microchip™ PIC, or ARM™ microcontroller) with onboard volatile and/or non-volatile memory.

Output device 508 can include any type of device for presenting information, including visual or audio information. For example, output device 508 can be a computer monitor, a flat-screen display, or a display panel (e.g., OLED, LCD, or TFT display panel).

Input device 510 can include any device for receiving input for electronic control device 500. Input device 510 can be a keyboard, keypad, button, switch, cursor-control device, touch-screen, camera, mouse, thumbwheel, trackball, microphone, card-reader, voice recognition software and the like depending on the requirements and implementation of the electronic control device 500. For example, input device 510 may include multiple user-operable controls (e.g., buttons) located on linear actuator(s) 530. Input device 510 can also include input ports and wireless radios (e.g., Bluetooth®, or 802.11x) for making wired and wireless connections to external devices.

FIG. 3A illustrates one example hardware schematic of an electronic control device 500. In alternative embodiments, electronic control device 500 contains fewer, additional or different components. For example, in some embodiments, the electronic control device 500 can include more than one processor 502 with each processor being configured to perform different dedicated tasks. In addition, although aspects of an implementation of electronic control device 500 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

The schematic of FIG. 3A illustrates the connection of electronic control device 500 to a sensor 134. Sensor 134 may be any type of sensor capable of detecting a load on the linear actuator(s) 530*a*, 530*b*. For example, sensor 134 can be a load cell, a strain gauge, a force sensing resistor, or a pressure transmitter. In one embodiment, sensor 134 can be communicatively connected to electronic control device 500 through a wired connection. In other embodiments, sensor 134 can be communicatively connected to electronic control device 500 across network 504 (e.g., a wired or wireless access network, which may include a private network and/or a public network such as the internet). These connections can allow electronic control device 500 and sensor 134 to communicate and/or relay signals with each other. For simplicity of illustration, only one sensor 134 is shown connected to electronic control device 500. However, multiple sensors 134 may be concurrently connected to electronic control device 500. Accordingly, electronic control device 500 can be communicatively coupled with multiple sensors 134 at a given time. Furthermore, multiple sensors 134 of different types can be used. For example, load cell and pressure transmitter sensors can be used in combination.

Figure 4A:
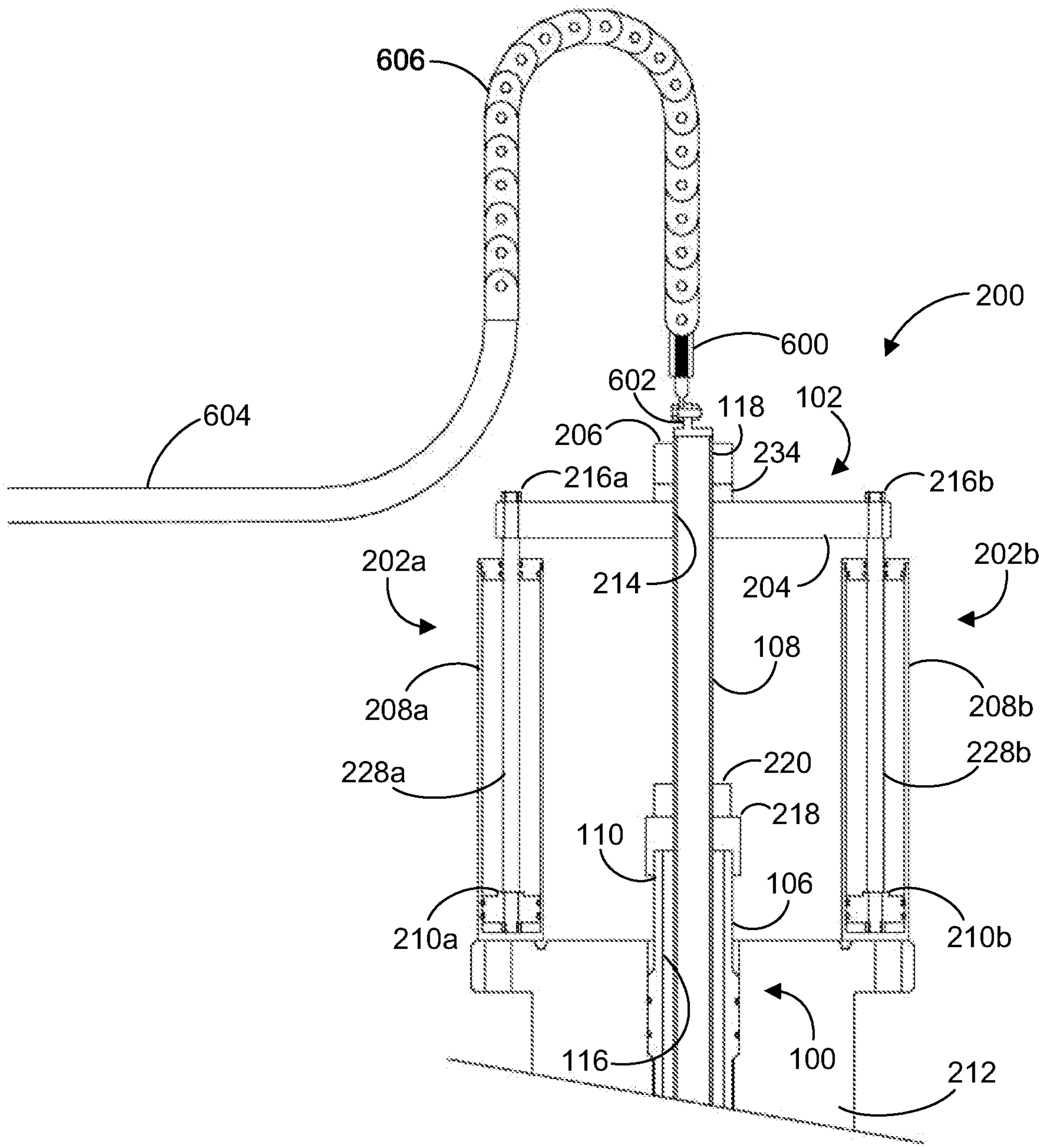
FIG. 4A is the partial cutaway view of FIG. 2B, showing a placement option for a load cell that may be used with the tensioning device.
Figure 4B:
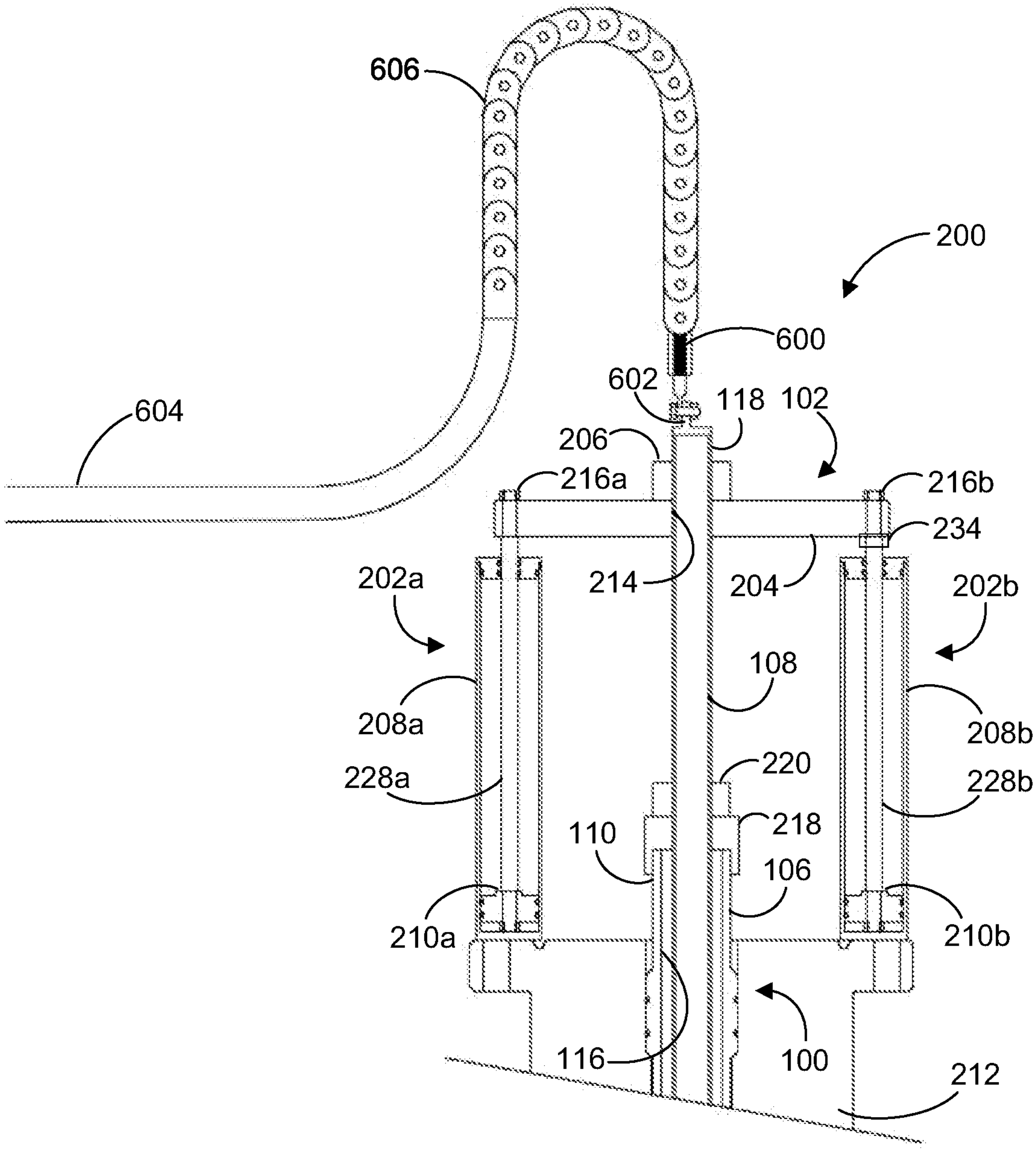
FIG. 4B is the partial cutaway view of FIG. 2B, showing another placement option for the load cell that may be used with the tensioning device.
Figure 4C:
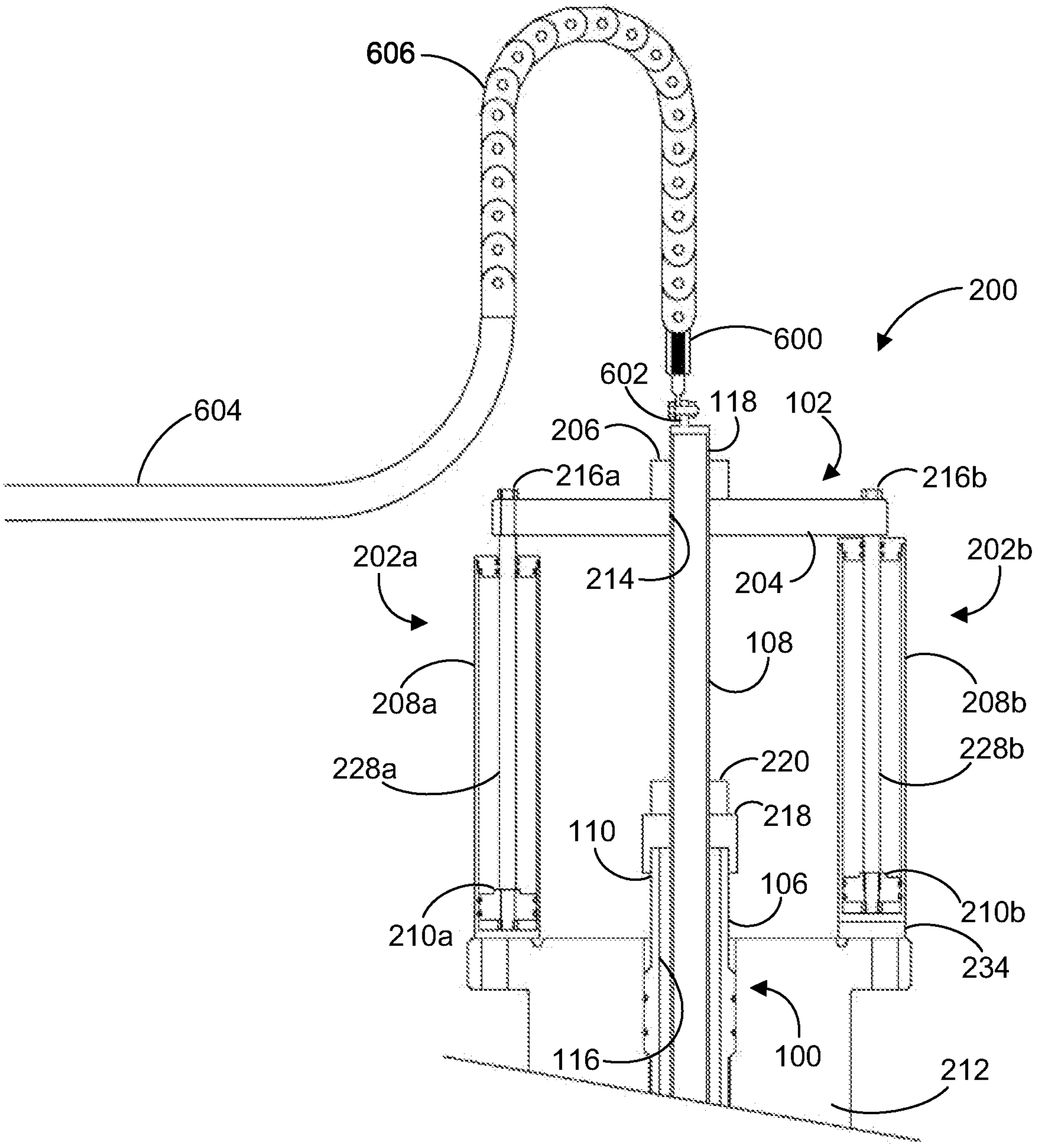
FIG. 4C is the partial cutaway view of FIG. 2B, showing another placement option for the load cell that may be used with the tensioning device.

Sensor 134 can be located in any position that allows it to take detect the load on linear actuator(s) 530*a*, 530*b*. Reference is now made to FIG. 4A to FIG. 4C, which show tensioning device 200 with example load cells 234 located in different exemplary positions, respectively. Load cell 234 is a force transducer that can convert a force into an electrical signal that can be measured and standardized. As the force applied to the load cell 234 increases, the electrical signal changes proportionally. FIG. 4A shows load cell 234 positioned between crosshead 204 and clamp 206. FIG. 4B shows load cell 234 positioned between crosshead 204 and linear actuator 202*a*. FIG. 4C shows load cell 234 positioned between linear actuator 202*b* and wellhead 212. It will be appreciated that other configurations are possible. For example, a load cell 234 can be positioned between crosshead 204 and linear actuator 202*b*, or between linear actuator 202*a* and wellhead 212. Furthermore, additional load cells 234 can be used.

Figure 4D:
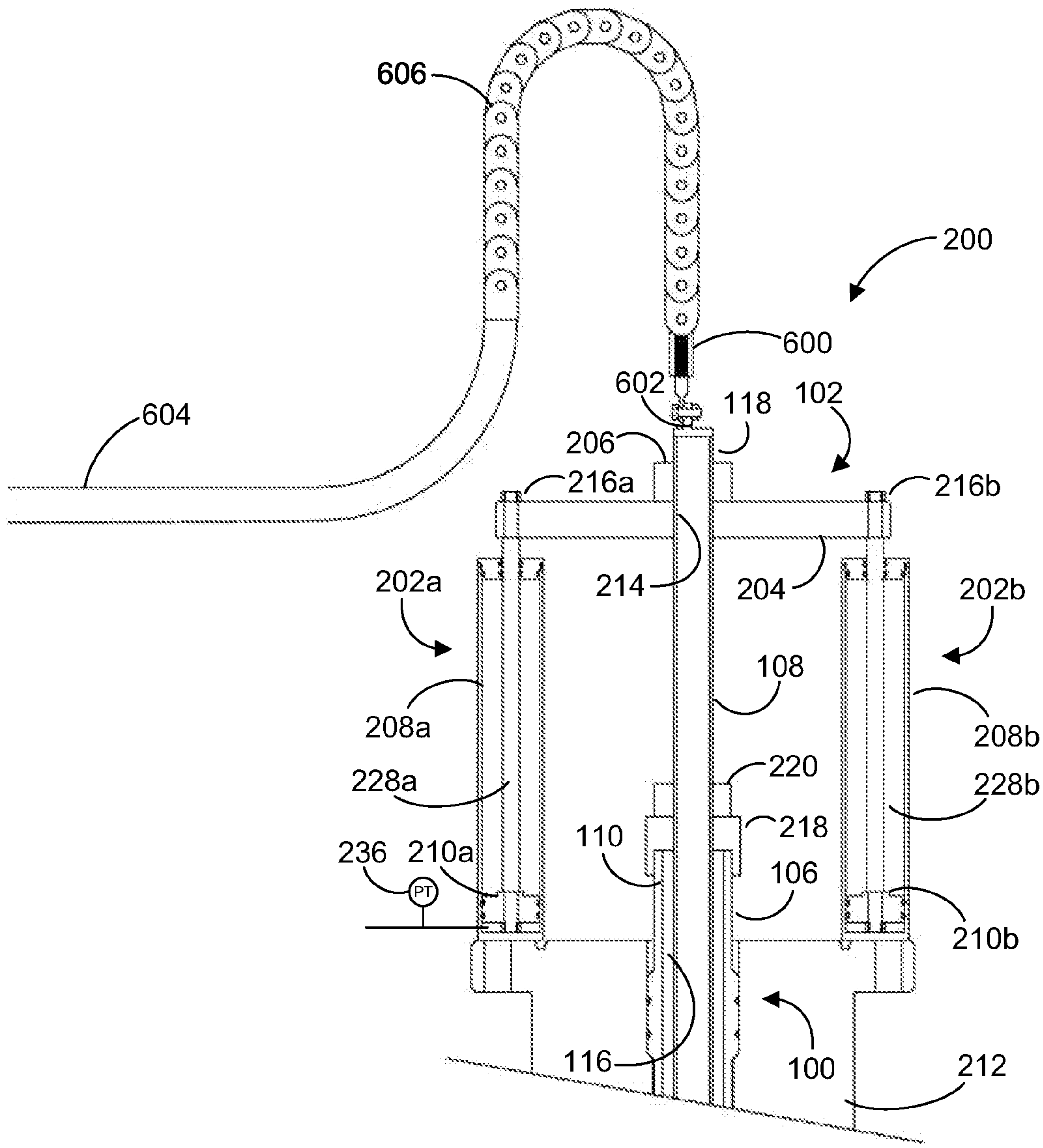
FIG. 4D is the partial cutaway view of FIG. 2B, showing a pressure transmitter coupled to a linear actuator of the tensioning device.

Reference is now made to FIG. 4D, which shows tensioning device 200 with pressure transmitter 236 coupled to linear actuator 202*a*. Pressure transmitter 236 is a pressure transducer that can measure fluid pressure (i.e., gas and/or liquid) within actuator housing 208*a*. Pressure transmitter 236 is capable of converting the pressure acting on it into electrical signals. As the pressure applied to the pressure transmitter 236 increases, the electrical signal changes proportionally. Since pressure transmitter 236 measures the fluid pressure within the actuator housing 208*a*, pressure transmitter 236 measures the load on the linear actuator 202*a* indirectly—which is in contrast to load cell 234. It will be appreciated that other configurations are possible. For example, a pressure transmitter 236 can be coupled to linear actuator 202*b*. Furthermore, additional pressure transmitters 236 can be used.

Referring again to FIG. 3A, processor 502 may receive load signals from sensor 134 at any time (e.g., just before or just after beginning operation), periodically (e.g., regularly every 0.5 to 10 seconds) and/or substantially continuously (e.g., a continuous analog signal, or signals at intervals of less than 0.5 seconds). Processor 502 can be configured to determine the tension of inner conductor 108 based on the received load signal(s). For example, processor 502 can be configured to detect the load on one or both of linear actuator(s) 530*a*, 530*b* based on the received load signal(s). Based on to the detected load, processor 502 can determine the tension of inner conductor 108. In some embodiments, a plurality of sensors 134 can be used and processor 502 may be configured to determine the tension of inner conductor 108 by averaging load signals received from multiple sensors 134.

In some embodiments, the tension force applied to inner conductor 108 by linear actuator(s) 530*a*, 530*b* can be varied according to the determined tension of inner conductor 108.

For example, electronic control device 500 can control linear actuators 530*a*, 530*b* according to load signals received from sensor(s) 134. In cases where electronic control device 500 determines that the tension of inner conductor 108 is below a threshold tension, it can signal linear actuator(s) 530*a*, 530*b* to increase the tension force applied to inner conductor 108. The threshold tension can be stored in memory 506 and adjusted as needed.

In some embodiments, the tension force applied by linear actuator(s) 530*a*, 530*b* can be automatically adjusted to obtain a target tension in inner conductor 108. Tension force applied by hydraulic actuators or pneumatic actuators can be automatically adjusted by mechanical automation. For example, a closed-loop mechanical control system can include an accumulator to maintain a target pressure and hence target tension on inner conductor 108.

For example, if the tension of the inner conductor 108 increases above a target maximum value, a pressure control valve can open and allow the accumulator to receive fluid (i.e., pressure) as the respective hydraulic or pneumatic actuator operates until the tension of the inner conductor 108 reduces to below the target maximum value. Similarly, if the tension of the inner conductor 108 decreases below a target minimum value, a pressure control valve can open again and allow the accumulator to release fluid as the respective hydraulic or pneumatic actuator operates until the tension of the inner conductor 108 increases above the target minimum value. It will be understood that other configurations are possible. For example, additional flow control devices can be included to control the direction of fluid to and from the accumulator as the pressure control valve opens.

Figure 3B:
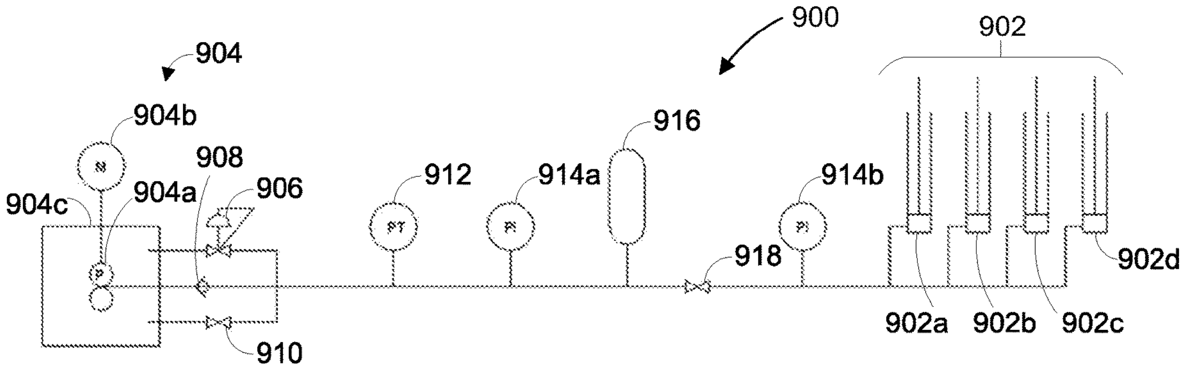
FIG. 3B is a schematic illustration of an example system for controlling a tensioning device.

Reference is now made to FIG. 3B, which shows an example control system 900 for maintaining the tension force applied by linear actuators 902*a*, 902*b*, 902*c*, and 902*d* (collectively referred to as linear actuators 902) of a tensioning device. Control system 900 can control fluid pressure (i.e., gas and/or liquid). As shown, control system 900 can include a hydraulic unit 904, a pressure transmitter 912, a backpressure valve 906, and an accumulator 916. Other configurations are possible. For example, while four linear actuators 902 are shown in FIG. 3B, it will be understood that the tensioning device can include fewer or more linear actuators 902.

Hydraulic unit 904 can be located locally at the well, or remotely from well. For example, hydraulic unit 904 can be local to an electromagnetic (EM) wave generator generating the high frequency electrical signals carried by the inner conductor 108. Hydraulic unit 904 can include a pump 904*a*, a pump motor 904*b*, a reservoir 904*c*, and one or more pressure switches (not shown). The one or more pressure switches of the hydraulic unit 904 can be configured with a "cut in" pressure setpoint (i.e., first pressure setpoint) and a "cut out" pressure setpoint (i.e., second pressure setpoint). When the pressure detected by the pressure switches is less than or equal to the first pressure setpoint, the pressure switches can close to allow the hydraulic unit 904 to pump fluid into the control line, and thereby increase the tension force applied by linear actuators 902. When the pressure detected by the pressure switches is equal to or greater than the second pressure setpoint, one or more of the pressure switches can open to stop the hydraulic unit 904 from pumping fluid into the control line, and thereby maintain the tension force applied by linear actuators 902. As a result, the applied tension force can vary between the first and second pressure setpoints of the hydraulic unit 904. As such, a target minimum value for the tension force can be used as the first pressure setpoint of the hydraulic unit 904 and a target value can be used as the second pressure setpoint of the hydraulic unit 904. In some embodiments, a target maximum value for the tension force can be used as the second pressure setpoint of the hydraulic unit 904.

For example, for linear actuators 902 to maintain a tension force of 7500 pound of force (lbf) at 1500 pound per square inch (PSI), the first pressure setpoint can be 1450 PSI and the second pressure setpoint can be 1500 PSI. In some embodiments, pump motor 904*b* can be about ½ A to 1 horsepower (hp) and reservoir 904*c* can have a capacity of approximately 5 gallons. Other configurations are possible.

Backpressure valve 906 can maintain a normal position and automatically operate when a backpressure setpoint (i.e., third pressure setpoint) is reached. Backpressure valve 906 can be normally closed to prevent fluid flow from linear actuators 902 to hydraulic unit 904. In some embodiments, a target maximum value for the tension force can be used as the backpressure setpoint. Continuing the above example of maintaining a tension force of 7500 lbf at 1500 PSI, the third pressure setpoint can be 1550 PSI. When backpressure valve 906 detects a pressure equal to or greater than the third pressure setpoint, backpressure valve 906 can open to allow fluid to flow from linear actuators 902 to hydraulic unit 904, namely reservoir 904*c*, and thereby reduce or relieve the tension force applied by linear actuators 902.

Accumulator 916 can be a vessel that automatically accepts pressure and automatically releases pressure as needed. Accumulator 916 can dampen the pressure fluctuations, particularly those introduced by the hydraulic unit 904. Continuing the above example of maintaining a tension force of 7500 lbf at 1500 PSI, accumulator 916 can be pre-charged to a pressure of 1250 PSI. In some embodiments, accumulator 916 can have a capacity of approximately 120 cubic inches (ci).

As shown in FIG. 3B, control system 900 can include one or more additional valves, such as but not limited to check valves and manual valves. Check valve, such as check valve 908, can ensure that fluid only flows in one direction. As shown, check valve 908 can ensure that fluid only flows from the hydraulic unit 904 to the linear actuators 902.

Manual valves, such as manual bleed valve 910 and manual loading valve 918, can maintain a normal position and be manually operated. For example, manual bleed valve 910 can be normally closed to prevent fluid flow from linear actuators 902 to hydraulic unit 904. Valve 910 can be manually operated to open and allow fluid to bleed, or flow from linear actuators 902 to hydraulic unit 904, namely reservoir 904*c*. In another example, manual loading valve 918 can be normally open during operation of the system to allow fluid flow to linear actuators 902. Valve 918 can be manually operated to close, such as to isolate linear actuators 902 from the control line for installation, maintenance, testing, calibration, etc. . . . . Furthermore, since control system 900 operates at a relatively high pressure (i.e., 1500 PSI), valve 918 can be a loading valve that provides a smooth progression between open and closed states.

As shown in FIG. 3B, control system 900 can include one or more additional instrumentation devices, such as but not limited to pressure indicators 914*a*, 914*b* (collectively referred to as pressure indicators 914). Pressure indicator 914*a*, being local to hydraulic unit 904, can indicate the pressure at hydraulic unit 904. Pressure indicator 914*b*, being local to linear actuators 922, can indicate the pressure at linear actuators 922.

Figure 3C:
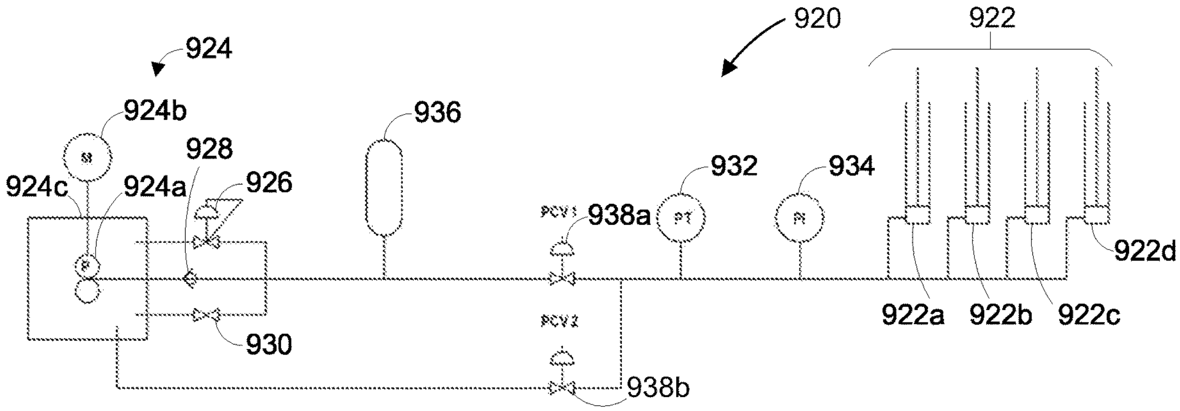
FIG. 3C is a schematic illustration of another example system for controlling a tensioning device.

Reference is now made to FIG. 3C, which shows another example control system 920 for maintaining the tension force applied by linear actuators 922*a*, 922*b*, 922*c*, and 922*d*

(collectively referred to as linear actuators 922) of a tensioning device. Similar to control system 900, control system 920 can control fluid pressure (i.e., gas and/or liquid) and can include a hydraulic unit 924 having a pump 924*a*, a pump motor 924*b*, a reservoir 924*c*, and one or more pressure switches; a backpressure valve 926, a check valve 928, a manual bleed valve 930, an accumulator 936, and a pressure transmitter 932 for measuring fluid pressure of linear actuators 922. However, control system 920 can include pressure control valves 938*a* and 938*b* (collectively referred to as pressure control valves 938) that can be operated based on the pressure detected by pressure transmitter 932. Other configurations are possible. For example, while four linear actuators 922 are shown in FIG. 3C, it will be understood that the tensioning device can include fewer or more linear actuators 922.

In some embodiments, the first, second, and third pressure setpoints can be higher than the maximum target value for the tension force so that the pressure control valves 938*a* and 938*b* can control the pressure while the hydraulic unit 904 can operates. For example, for linear actuators 922 to maintain a tension force of 7500 pound of force (lbf) at 1500 pound per square inch (PSI), the first, second, and third pressure setpoints can be 1650 PSI, 1700 PSI, and 1750 PSI respectively.

Pressure control valves 938*a*, 938*b* can be configured to operate to control the pressure based on a minimum target value, a maximum target value, and/or a target value. For example, when the pressure detected by pressure transmitter 932 is less than or equal to the minimum target value, pressure control valve 938*a* can open and pressure control valve 938*b* can remain closed, allowing the hydraulic unit 924 to pump fluid into the control system 920, and thereby increase the tension force applied by linear actuators 922. When the pressure detected by pressure transmitter 932 is equal to or greater than the target value, pressure control valve 938*a* can close and pressure control valve 938*b* can remain closed, stopping the hydraulic pump 924 from pumping fluid into the control line, and thereby maintain the tension force applied by linear actuators 922. When the pressure detected by pressure transmitter 932 is equal to or greater than the maximum target value, pressure control valve 938*b* can open to allow fluid to flow from linear actuators 922 to hydraulic unit 924, namely reservoir 924*c*, and thereby reduce or relieve the tension force applied by linear actuators 922. Other configurations are possible.

In control system 920, pressure control valves 938 can automatically control fluid pressure based on detected pressure. As such, control system 920 can be referred to as an active control system, that is, a system with feedback. In contrast, control system 900 can be referred to as a passive control system, that is, a system without feedback because fluid pressure is not automatically controlled based on detected pressure.

Pressure indicator 934, being local to linear actuators 922, can indicate the pressure at linear actuators 922. While only one pressure indicator 934 is shown in FIG. 3C, it will be understood that control system 920 can include fewer or more pressure indicators 934.

Figure 3D:
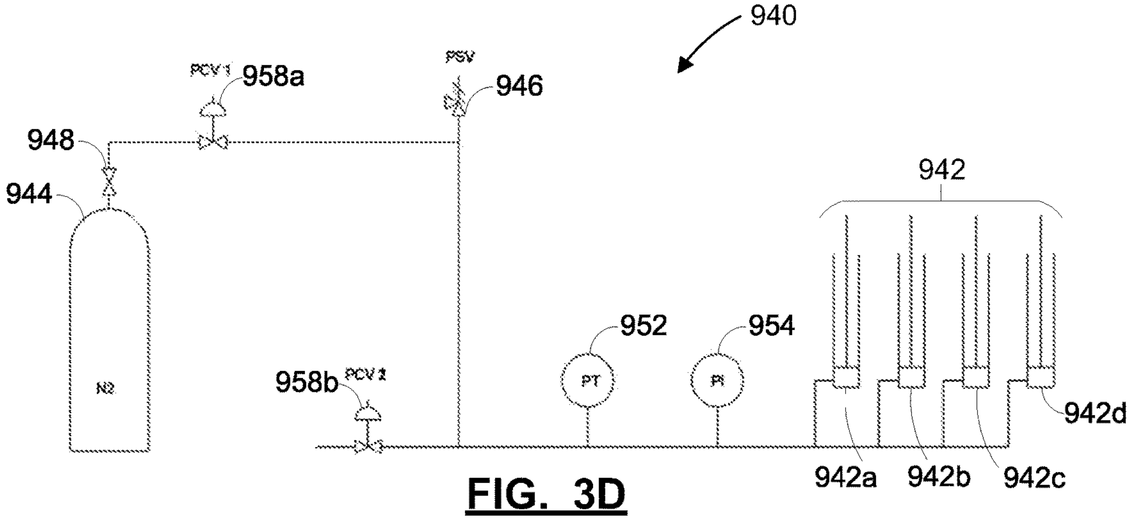
FIG. 3D is a schematic illustration of another example system for controlling a tensioning device.

Reference is now made to FIG. 3D, which shows another example control system 940 for maintaining the tension force applied by linear actuators 942*a*, 942*b*, 942*c*, and 942*d* (collectively referred to as linear actuators 942) of a tensioning device. Control system 940 can be a gas pressure control system and include a tank 944 and pressure control valves 958*a* and 958*b* (collectively referred to as pressure control valves 958). Tank 944 can store any appropriate actuating gas, such as but not limited to nitrogen. Pressure control valves 958 can be operated based on the pressure detected by pressure transmitter 952. Other configurations are possible. For example, while four linear actuators 942 are shown in FIG. 3D, it will be understood that the tensioning device can include fewer or more linear actuators 942.

Pressure control valves 958*a*, 958*b* can be configured to operate to control the pressure based on a minimum target value, a maximum target value, and/or a target value.

For example, when the pressure detected by pressure transmitter 952 is less than or equal to the minimum target value, pressure control valve 958*a* can open and pressure control valve 958*b* can remain closed, allowing actuating gas from tank 944 to flow into the control system 940, and thereby increase the tension force applied by linear actuators 942. When the pressure detected by pressure transmitter 952 is equal to or greater than the target value, pressure control valve 958*a* can close and pressure control valve 958*b* can remain closed, stopping the flow of actuating gas between tank 944 and the control system, and thereby maintain the tension force applied by linear actuators 942. When the pressure detected by pressure transmitter 932 is equal to or greater than the target maximum value, pressure control valve 938*b* can open to allow release of actuating gas from the control system 940, and thereby reduce or relieve the tension force applied by linear actuators 942.

As shown in FIG. 3D, control system 940 can include one or more additional valves, such as but not limited to safety valves and manual valves. Safety valves, such as pressure safety valve 946, can ensure that the pressure does not exceed a maximum pressure. In some embodiments, pressure safety valve 946 can open when it detects a pressure greater than 1550 PSI, for example.

Manual valves, such as manual valve 948, can maintain a normal position and be manually operated. For example, manual valve 948 can be normally open during operation of the system to allow gas to flow from the tank 944. Valve 948 can be manually operated to close, such as to isolate the tank 944 for installation, maintenance, testing, calibration, etc. . . .

While two pressure control valves 958 are shown in FIG. 3D, it will be understood that control system 940 can include fewer or more pressure control valves 958. For example, in some embodiments, control system 940 can include only one pressure control valve 958 that is a relieving type of valve. In addition to being open at a first setpoint to allow gas flow, relieving valves can relieve pressure while also being closed to prevent gas flow.

Pressure indicator 954, being local to linear actuators 942, can indicate the pressure at linear actuators 942. While only one pressure indicator 954 is shown in FIG. 3D, it will be understood that control system 940 can include fewer or more pressure indicators 954.

In another example, electronic control device 500 can control linear actuator(s) 530*a*, 530*b* according to load signals received from sensor(s) 134. If electronic control device 500 determines that the detected tension is below the target tension of inner conductor 108, it can signal linear actuator(s) 530*a*, 530*b* to increase the tension force applied to inner conductor 108 to obtain the target tension. On the other hand, if electronic control device 500 determines that the detected tension is above the target tension of inner conductor 108, it can signal linear actuator(s) 530*a*, 530*b* to decrease the tension force applied to inner conductor 108 to obtain the target tension. The target tension can be stored in memory 506 and adjusted as needed. It will be appreciated that the target tension may vary for different applications and/or lengths of coaxial transmission line 100.

Figure 5:
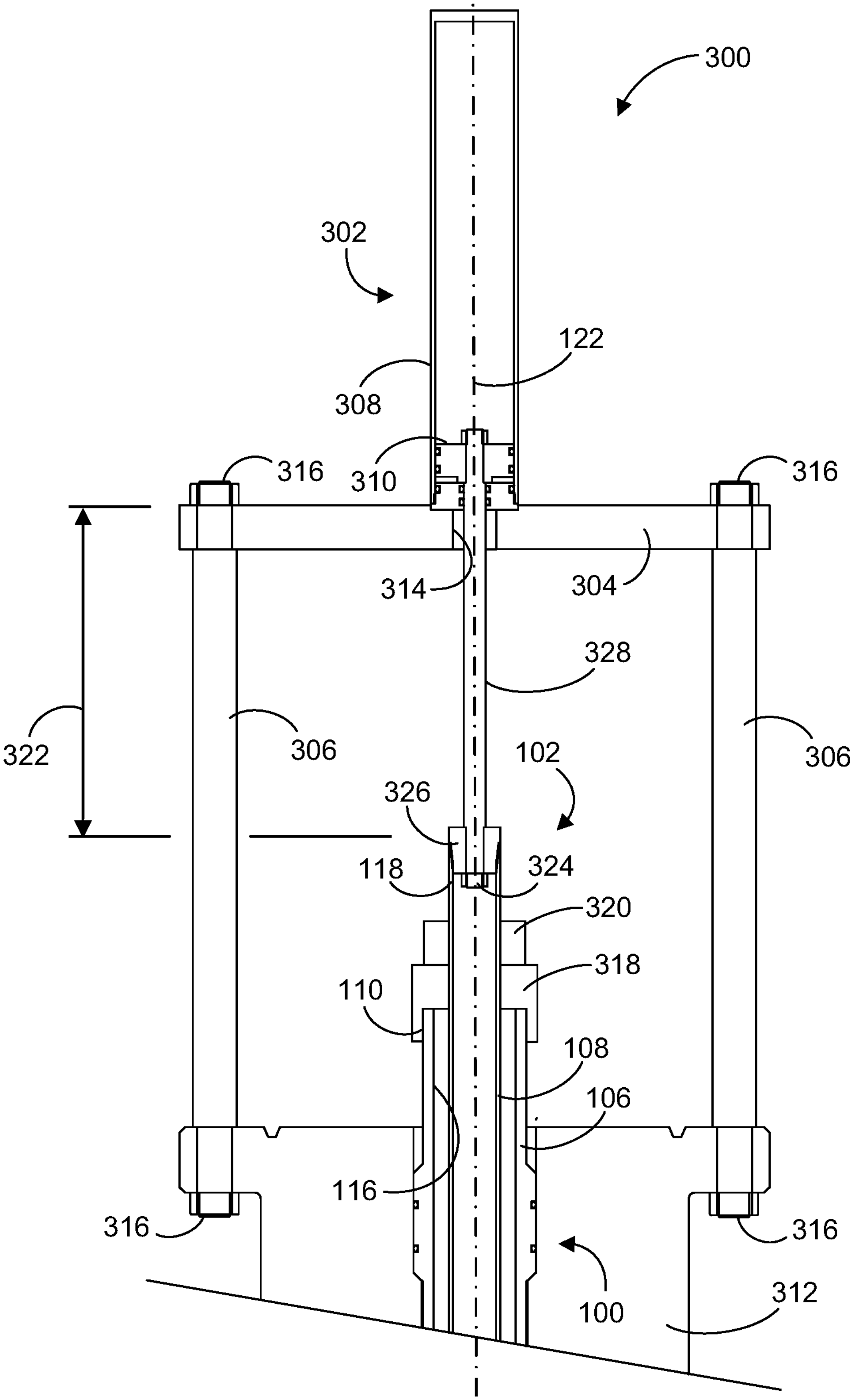
FIG. 5 is a partial cutaway view of another example power transmission apparatus, including another example tensioning device connected to the coaxial transmission line of FIG. 1A.

Reference is now made to FIG. 5, which shows another example tensioning device 300 coupled to coaxial transmission line 100 at first line end 102. Similar to tensioning device 200 of FIG. 2A, tensioning device 300 acts to apply a tension force to inner conductor 108 at inner conductor first end 118. The applied tension force can limit or prevent deflection of inner conductor 108 within internal passage 116, thereby reducing the occurrence of a short circuit along coaxial transmission line 100.

In some embodiments, such as the example shown in FIG. 5, tensioning device 300 has a linear actuator 302 and a non-conductive coupling element that includes a support member 304 and a pair of parallel support rods 306. Collectively, support member 304 and support rods 306 may be referred to herein as a support assembly. As will be described in more detail below, the support assembly couples linear actuator 302 to inner conductor first end 118. Support member 304 is preferably non-conductive to maintain electrical isolation of the inner conductor 108 from the outer conductor 106. In some embodiments, support member 304 can be made of a non-conductive material (e.g., a hard plastic). In other embodiments, support member 304 can be coated with a non-conductive material.

Linear actuator 302 includes an actuator housing 308 and a piston 310 therein. Actuator housing 308 can be a cylinder. Piston 310 includes a piston rod 328 that is rigidly coupled to the piston 310. Piston 310 is movable with respect to actuator housing 308. In some embodiments, linear actuator 302 is one of a hydraulic actuator, an electromagnetic actuator, and a pneumatic actuator. As will be described below, piston rod 328 is rigidly coupled to the inner conductor first end 118 so that actuation of piston 310 varies the tension force applied to inner conductor first end 118. In some embodiments, linear actuator 302 is coaxial with inner conductor first end 118. That is, a central axis of linear actuator 302 is coincident with inner conductor central axis 122 at inner conductor first end 118. The support assembly (e.g., support member 304 and support rods 306) can position actuator housing 308 longitudinally adjacent to outer conductor first end 108 and inner conductor first end 118. The support assembly positions actuator housing 308 so that piston 310 is axially aligned with inner conductor first end 122. In the embodiment shown, the support assembly positions actuator housing 308 at a distance 322 from inner conductor first end 118. Such a configuration can provide the necessary clearance for piston 310 to extend in and out of actuator housing 308.

In the embodiment shown in FIG. 5, two support rods 306 are used to hold support member 304 at the distance 322 from inner conductor first end 118. The length of support rods 306 can be varied to adjust the distance 322 between inner conductor first end 118 and support member 304. In other embodiments, additional support rods 306 may be provided to improve the stability of support member 304. Support rods 306 can project from any suitable support. In some embodiments, such as the example shown in FIG. 5, each support rod 306 is located between a wellhead 312 and the support member 304. Bolts 316 are used to fix support rods 306 to wellhead 312 at one end and support member 304 at the other end. Other mechanical fasteners may be used. In some cases, each wellhead 312 may support multiple tensioning devices 300. Optionally, wellhead 312 can be grounded to the power source.

Referring still to FIG. 5, support member 304 includes a central internal bore 314. Actuator housing 308 can abut support member 304 for support. As shown, actuator housing 308 is seated on support member 304 and is aligned so that piston 310 can actuate unobstructed through internal bore 314. In some embodiments, actuator housing 308 is mechanically fastened to support member 304 to improve stability.

Piston rod 328 can be rigidly coupled to inner conductor first end 118 in any suitable manner that allows its actuation to vary a tension force applied to inner conductor 108. As an example, a clamp or another type of mechanical fastener may be used to couple piston rod 328 to inner conductor first end 118. In the embodiment shown, inner conductor first end 118 extends outwardly from outer conductor first end 110. This arrangement can simplify the coupling of piston rod 328 to inner conductor first end 118. As shown, a piston fastener 324 couples an end of piston rod 328 to an inner conductor cap 326, which is physically connected to inner conductor first end 118. Accordingly, actuation of piston 310 (e.g., movement in or out) adjusts the tension force that is applied to inner conductor first end 118. Inner conduct cap 326 also acts as a seal at inner conductor first end 118 and thereby maintains the pressurization of inner conductor 108.

Linear actuator 302 applies a tension force to inner conductor first end 118 that is inversely correlated to the degree to which piston 310 extends from actuator housing 308. That is, as piston 310 extends farther from actuator housing 308, the tension force applied to inner conductor first end 118 decreases. For example, FIG. 5 shows piston 310 fully extended from actuator housing 308. In this position, linear actuator 302 applies a relatively low tension force to inner conductor first end 118. If piston 310 were to retract into actuator housing 308 from its position shown in FIG. 5, the tension force applied to inner conductor first end 118 by linear actuator 302 increases.

In the embodiment shown, a non-conductive stabilizer 318 is positioned at outer conductor first end 110. As described above with reference to stabilizer 218 of FIG. 2A, stabilizer 318 can (i) maintain the physical separation between outer and inner conductors 106, 108 at outer conductor first end 110 and/or (ii) act as an annular cavity seal to impede or prevent the escape of dielectric fluid insulator from annular cavity 124 at outer conductor first end 110. In the embodiment shown, assembly ring 320 is used during installation to maintain a pre-tension on the inner conductor 108 until the tensioning device 300 is installed. Assembly ring 320 can be an assembly clamp. Other configurations are possible.

In some embodiments, linear actuator 302 can be actuated by a gas actuation system. Actuator housing(s) 308 can include a gas port (not shown in FIG. 5). Actuator housing(s) 308 can be pressurized by introducing gas via the gas port. The internal gas pressure within actuator housing(s) 308 actuates piston 310. Increasing the internal gas pressure moves piston(s) 310 away from outer conductor first end 110 and thereby increases the tension force it applies to inner conductor first end 118. Accordingly, gas can be introduced into actuator housing 308 via the gas port to increase the applied tension force. Conversely, decreasing the internal gas pressure moves piston 310 toward outer conductor first end 110 and thereby decreases the tension force it applies to inner conductor first end 118.

As described above, a dielectric fluid insulator can be sealed or circulated within annular cavity 128 of coaxial transmission line 100 to increase power transmission and/or maintain the electrical isolation of outer and inner conductors 106, 108. In some embodiments, a dielectric fluid system used for circulating dielectric fluid within coaxial transmission line 100 can also be used to actuate linear actuator 302. In other embodiments, a gas actuation system that is separate from the dielectric fluid system can be provided to actuate linear actuator 302. While a separate gas actuation system involves additional control and instrumentation components, thereby increasing complexity, it may improve the overall reliability of the coaxial transmission line 100 as failure of the gas actuation system does not result in failure of the dielectric fluid system and vice versa.

Figure 6:
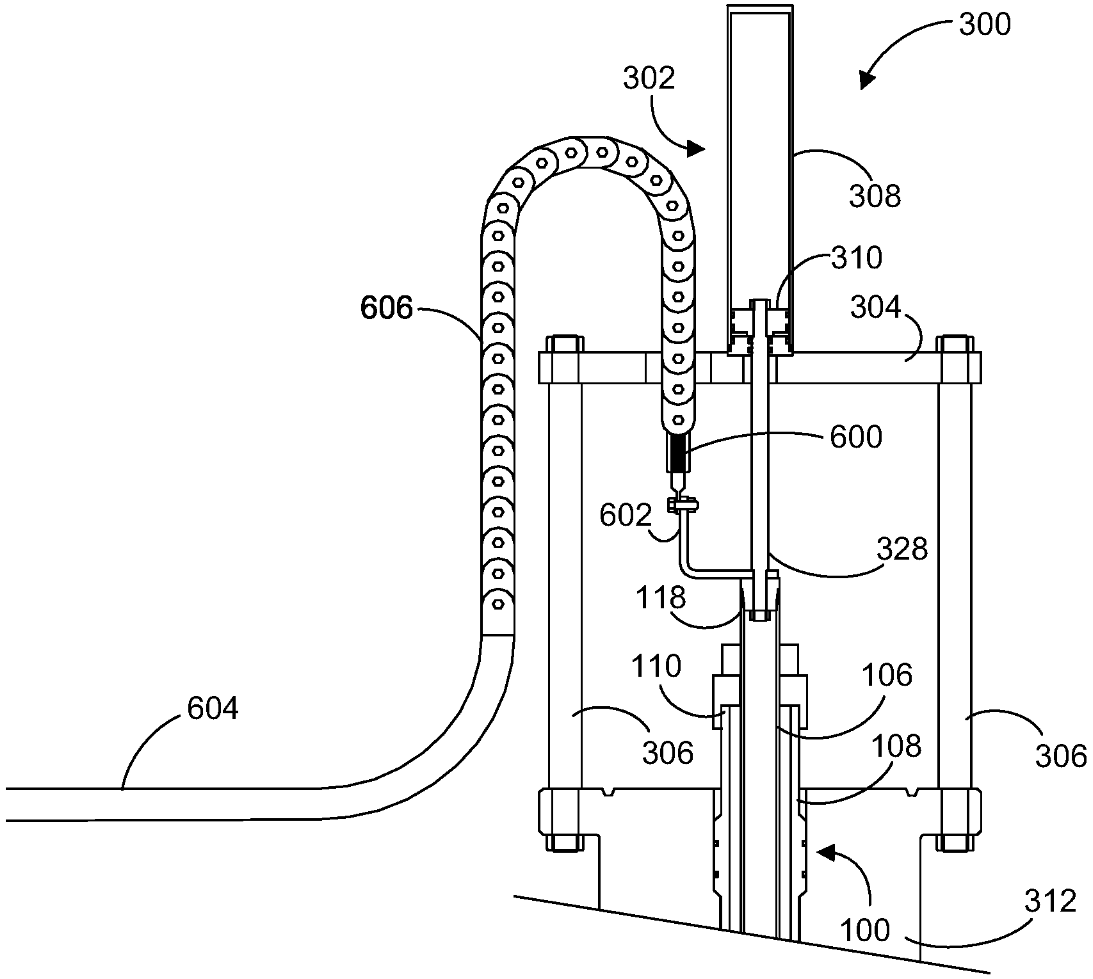
FIG. 6 is the partial cutaway view of FIG. 5, with a power source electrically coupled to the inner conductor.

Inner conductor first end 118 can be electrically coupled to a power source in any suitable manner. For example, FIG. 6 shows inner conductor first end 118 electrically coupled to a power cable 600 by a latch 602. In the embodiment shown, power cable 600 is routed through a cable tray 604 and cable carrier 606 before being coupled to latch 602. Cable carrier 606 can accommodate movement of the power cable 602 in the vertical direction. Cable tray 604 can secure and support power cable 602, reduce wear and stress on power cable 602, prevent entanglement, and improve operator safety. Cable tray 604 and/or cable carrier 606 may be made of a non-magnetic metal (e.g., aluminum, tin, copper, etc.) or a non-metallic material (e.g., plastic) to control eddy current losses. Tensioning device 300, cable tray 604, and/or power cable 602, or portions thereof, can be located in an enclosure for shelter and protecting from the environment.

Figure 7:
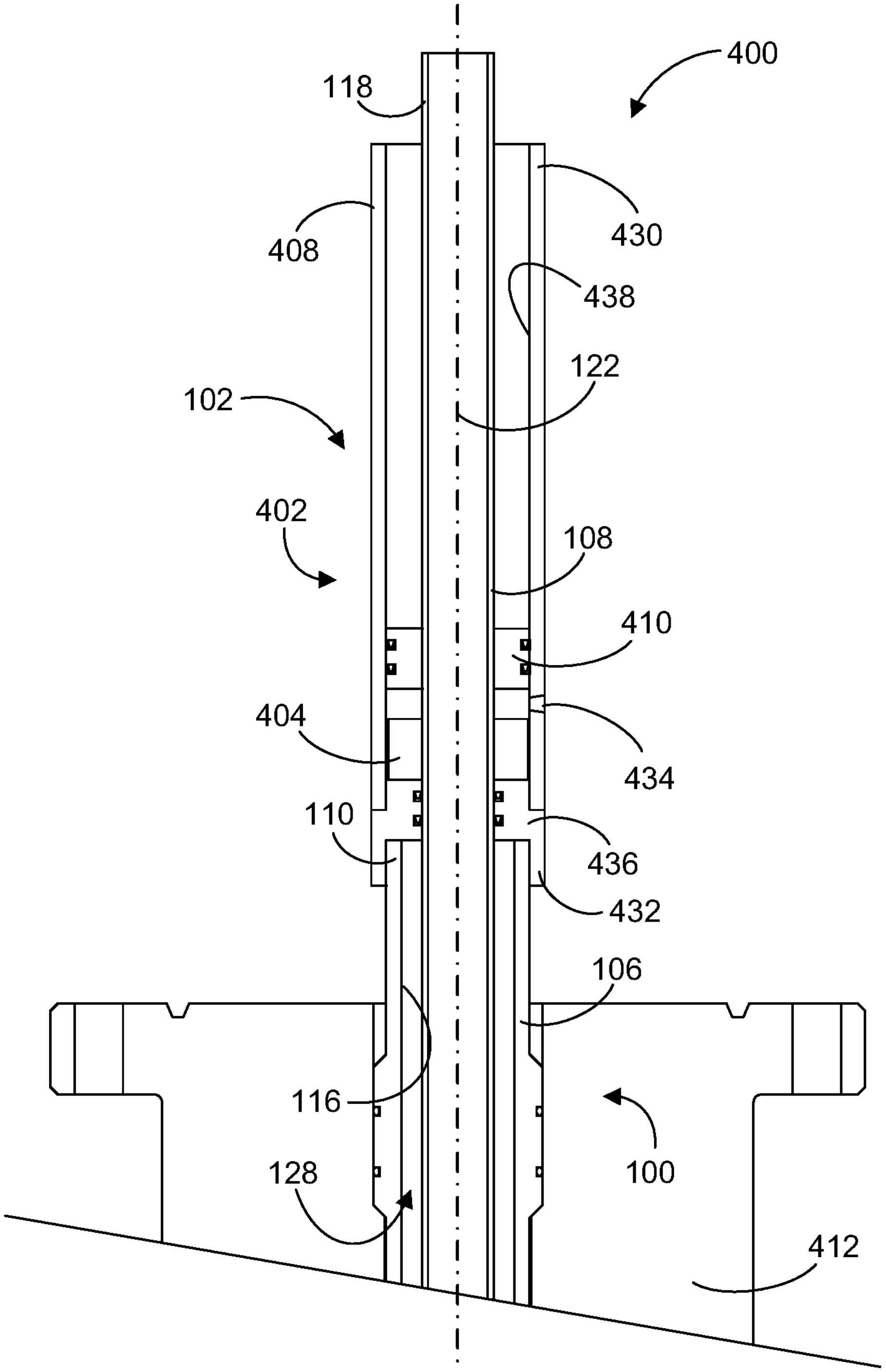
FIG. 7 is a partial cutaway view of another example power transmission apparatus, including another example tensioning device connected to the coaxial transmission line of FIG. 1A.

Reference is now made to FIG. 7, which shows another tensioning device 400 coupled to coaxial transmission line 100 at first line end 102. Similar to tensioning device 200 of FIG. 2A and tensioning device 300 of FIG. 5, tensioning device 400 acts to apply a tension force to inner conductor 108 at inner conductor first end 118. The applied tension force can limit or prevent deflection of inner conductor 108 within internal passage 116, thereby reducing the occurrence of a short circuit along coaxial transmission line 100. As an example, FIG. 7 shows coaxial transmission line 100 extending outwardly from a wellhead 412. Wellhead 412 can be grounded to the power source. In this example, coaxial transmission line 100 may be used to deliver power to an electromagnetic load (e.g., EM radiator) located in a well bore below the earth's surface. Many other applications of coaxial transmission line 100 are possible.

As shown, tensioning device 400 includes a linear actuator 402 and a coupling element, e.g., assembly ring 404. As will be described in more detail below, assembly ring 404 couples linear actuator 402 to inner conductor 108 proximate to inner conductor first end 118. In the embodiment shown, inner conductor first end 118 extends outwardly from outer conductor first end 110. This can simplify the coupling of linear actuator 402 to inner conductor 108 with assembly ring 404.

Linear actuator 402 includes an actuator housing 408 and a piston 410 therein. Piston 410 is movable with respect to actuator housing 408. In some embodiments, linear actuator 402 is one of a hydraulic actuator, an electromagnetic actuator, and a pneumatic actuator. Piston 410 can be annular (ring-shaped) and have an internal opening slightly larger than an outer diameter of inner conductor 108. Accordingly, piston 410 can fit around inner conductor 108. As shown, piston 410 physically separates inner conductor first end 118 from actuator housing 408. Piston 410 is rigidly coupled to inner conductor 108 in any suitable manner, e.g., mechanical fasteners. In the embodiment shown, assembly ring 404 rigidly couples piston 410 to inner conductor 108. In this way, actuation of piston 410 varies the tension force applied to inner conductor first end 118. In the embodiment shown, piston 410 is rigidly coupled to inner conductor 108 within actuator housing 408, and inner conductor 108 extends through actuator housing 408.

As shown in FIG. 7, the linear actuator 402 can be coaxial with inner conductor first end 118. That is, a central axis of linear actuator 402 is coincident with inner conductor central axis 122 at inner conductor first end 118. Actuator housing 408 may be coupled to outer conductor first end 110 (e.g., with mechanical fasteners or in another suitable manner). Accordingly, actuator housing 408 does not move relative to outer conductor 106 as the piston 410 is actuated. This may improve the stability of linear actuator 402.

Actuation of piston 410 (e.g., movement in or out) adjusts the tension force that is applied to inner conductor first end 118. In the embodiment shown, as piston 410 moves away from outer conductor first end 110, the tension force applied to inner conductor 108 increases. Conversely, as piston 410 moves toward outer conductor first end 110, the tension force applied to inner conductor 108 decreases.

In some embodiments, linear actuator 402 can be actuated by a gas actuation system. Referring to FIG. 7, actuator housing 408 includes a housing first end 430, a housing second end 432 opposed to first housing end 430, and a gas port 434. Actuator housing 408 can be pressurized by introducing gas via gas port 434. The internal gas pressure within actuator housing 408 actuates piston 410. In the embodiment shown, increasing the internal gas pressure moves piston 410 away from outer conductor first end 110 and thereby increases the tension force it applies to inner conductor first end 118. Accordingly, gas can be introduced into actuator housing 408 via gas port 434 to increase the applied tension force. Conversely, decreasing the internal gas pressure moves piston 410 toward outer conductor first end 110 and thereby decreases the tension force it applies to inner conductor first end 118.

Referring still to FIG. 7, assembly ring 404 is preferably non-conductive to maintain electrical isolation of inner conductor 108 from outer conductor 106. In some embodiments, assembly ring 404 can be made of a non-conductive material (e.g., a hard plastic). In other embodiments, assembly ring 404 can be coated with a non-conductive material. Alternatively, or in addition, actuator housing 408 may be made of an insulator. Alternatively, or in addition, an interior wall 438 of actuator housing 408 (e.g., from first housing end 430 to second housing end 432) may be coated or lined with an insulator. In some embodiments, actuator housing 408 is made of fibre-reinforced plastic. Fibre-reinforced plastic is durable and relatively non-conductive.

In some embodiments, housing second end 432 includes a seal gland 436. As described above, a dielectric fluid insulator can be sealed or circulated within annular cavity 128 of coaxial transmission line 100 to increase power transmission and/or maintain the electrical isolation of outer and inner conductors 106, 108. Seal gland 436 may act to seal the pressurized gas in actuator housing 408 from the pressurized dielectric fluid in coaxial transmission line 100. That is, the pressurized gas in actuator housing 408 and the dielectric fluid in coaxial transmission line 100 are separate and do not mix.

In other embodiments, the dielectric fluid insulator circulated within coaxial transmission line 100 can actuate linear actuator 402. The dielectric fluid insulator can be an electronegative liquid or gas, such as nitrogen or air, for example. In these embodiments, gas port 434 can be plugged and seal gland 436 at housing second end 432 omitted. In this way, the dielectric fluid insulator is in fluid communication with actuator housing 408. The dielectric fluid insulator is free to flow between piston 410 and annular cavity 128.

The internal gas pressure within coaxial transmission line 100 provided by the dielectric fluid insulator can actuate piston 410. Increasing the amount of dielectric fluid insulator within coaxial transmission line 100 can move piston 410 away from outer conductor first end 110 and thereby increase the tension force it applies to inner conductor first end 118. Conversely, decreasing the amount of dielectric fluid insulator within coaxial transmission line 100 can move piston 410 toward outer conductor first end 110 and thereby decrease the tension force it applies to inner conductor first end 118.

Figure 8:
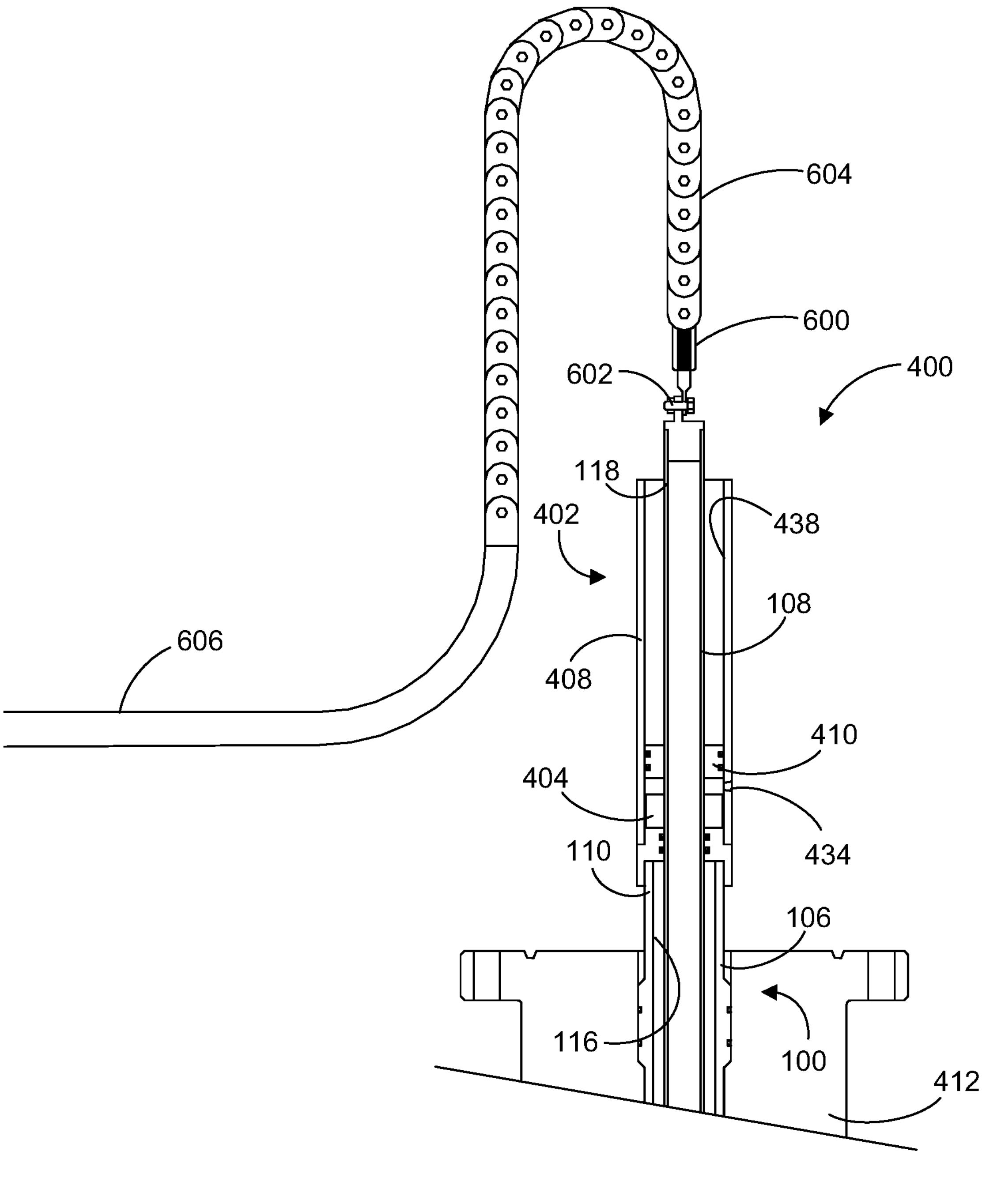
FIG. 8 is the partial cutaway view of FIG. 7, with a power source electrically coupled to the inner conductor.

Inner conductor first end 118 can be electrically coupled to a power source in any suitable manner. For example, FIG. 8 shows inner conductor first end 118 electrically coupled to a power cable 600 by a latch 602. In the embodiment shown, power cable 600 is routed through a cable tray 604 and cable carrier 606 before being coupled to latch 602. As described above, cable carrier 606 can accommodate movement of the power cable 602 in the vertical direction and cable tray 604 can secure and support power cable 602, reduce wear and stress on power cable 600, prevent entanglement, and improve operator safety. As noted above, cable tray 604 and/or cable carrier 606 may be made of a non-magnetic metal (e.g., aluminum, tin, copper, etc.) or a non-metallic material (e.g., plastic) to control eddy current losses. Tensioning device 400, cable tray 604, and/or power cable 602, or portions thereof, can be located in an enclosure for shelter and protection from the environment.

Figure 9:
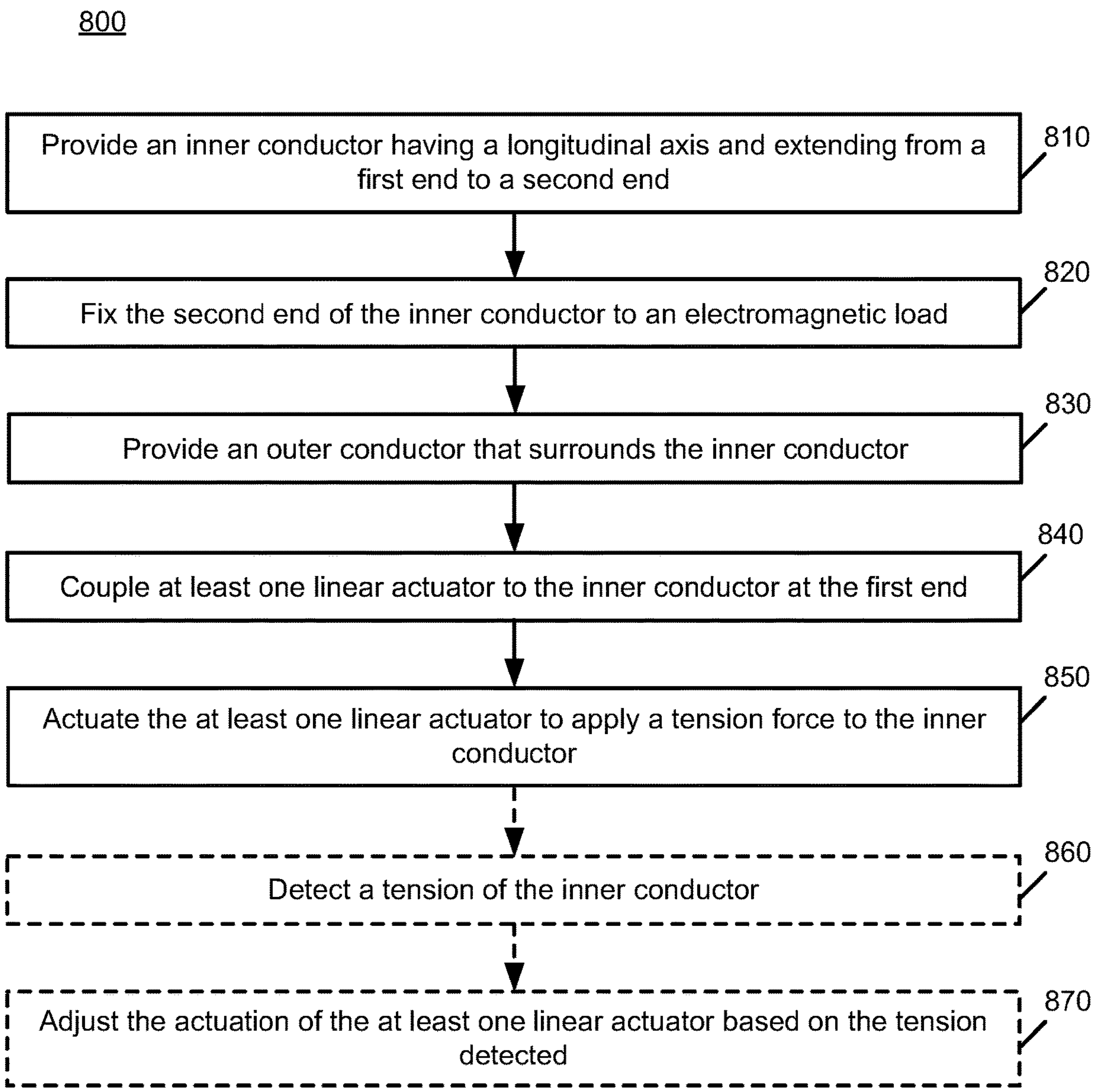
FIG. 9 is a flowchart of an example method of providing a coaxial transmission line.

FIG. 9 shows a flowchart illustrating an example method 800 of providing a coaxial transmission line. To assist with the description of the method 800, reference will be made simultaneously to the examples shown in FIG. 1A to FIG. 8.

At 810, an inner conductor 108 is provided. Inner conductor 108 extends from an inner conductor first end 118 to an inner conductor second end 120 along an inner conductor longitudinal axis 122 (FIG. 1A).

At 820, inner conductor second end 120 is fixed to an electromagnetic load. The electromagnetic load may be an electromagnetic (EM) radiator, antenna, application, or lossy transmission line, for example. Inner conductor second end 120 can be electrically coupled to the electromagnetic load in any suitable manner. For example, a latching mechanism may be used. In some embodiments, step 820 also involves electrically coupling inner conductor first end 118 to an electrical power source. In these embodiments, inner conductor first end 118 can be electrically coupled to the power source in any suitable manner.

At 830, an outer conductor 106 is provided. Outer conductor 106 surrounds inner conductor 108. Outer conductor 106 extends from an outer conductor first end 110 to an outer conductor second end 112 along an outer conductor longitudinal axis 114 (FIG. 1A). Outer conductor 106 has an internal passage 116 that extends between outer conductor first end 110 and outer conductor second end 112 (FIG. 1B). In some embodiments, steps 810 and 830 are performed simultaneously and involve routing inner conductor 108 through internal passage 116 of outer conductor 106. Inner conductor 108 and outer conductor 106 collectively form part of coaxial transmission line 100. Power may be delivered to the electromagnetic load through the coaxial transmission line 100.

At 840, at least one linear actuator is coupled to inner conductor 108 at inner conductor first end 118. In some embodiments, each linear actuator can include an actuator housing (e.g., actuator housing 208 of FIG. 2A, actuator housing 308 of FIG. 5, actuator housing 408 of FIG. 7) and a piston (e.g., piston 210 of FIG. 2A, piston 310 of FIG. 5, piston 410 of FIG. 7). Each piston 210, 310, 410 is movable (i.e., capable of being actuated) with respect actuator housing 208, 308, 408. Pistons can be rigidly coupled to a respective piston rod (e.g., piston rod 228 of FIG. 2A, piston rod 328 of FIG. 5).

In some embodiments, step 840 involves coupling a plurality of linear actuators 202 circumferentially around inner conductor longitudinal axis 122 at inner conductor first end 118. This can involve positioning the plurality of linear actuators around at least part of inner conductor 108 at inner conductor first end 118. For example, FIG. 2A shows two linear actuators 202 positioned circumferentially around inner conductor longitudinal axis 122 at inner conductor first end 118. As exemplified in FIG. 2A, coupling linear actuators 202 to inner conductor 108 at inner conductor first end 118 can involve coupling a crosshead 204 to inner conductor 108, and coupling each linear actuator 202 to crosshead 204. A clamp 206 can be applied as shown to prevent inner conductor first end 118 from disengaging with crosshead 204.

With reference to FIGS. 5 and 9, step 840 can involve coupling a linear actuator 302 to inner conductor 108 so that a central axis of the linear actuator 302 is coaxial with inner conductor longitudinal axis 122 at first inner conductor end 118. As shown, coupling linear actuator 302 to inner conductor 108 at inner conductor first end 118 can involve positioning actuator housing 308 longitudinally adjacent to inner conductor first end 118 and outer conductor first end 110, and coupling piston 310 to inner conductor 108.

As shown in FIG. 5, positioning actuator housing 308 longitudinally adjacent to inner conductor first end 118 and outer conductor first end 110 can involve positioning actuator housing 308 at a distance 322 from inner conductor 108 that allows piston 310 to extend in and out of actuator housing 308. That is, distance 322 can provide the necessary clearance for piston 310 to actuate. In the embodiment shown, support member 304 and support rods 306 are used to position actuator housing 308 at the distance 322 from inner conductor 108. Other configurations are possible.

In other embodiments, coupling linear actuator 402 to inner conductor 108 so that a central axis of the linear at inner conductor first end 118 can involve positioning actuator housing 408 along at least a portion of the inner conductor 108 at the first inner conductor end 118, as shown in FIG. 7. That is, step 840 can involve coupling actuator housing 408 to outer conductor 106, routing inner conductor 108 in actuator housing 408, and engaging inner conductor first end 118 with piston 410. Coupling linear actuator 402 to outer conductor 106 may improve stability.

Referring again to FIG. 9, step 850 involves actuating the at least one linear actuator to apply a tension force to inner conductor 108. In some embodiments, this can involve using a gas actuation system to actuate the at least one linear actuator (i.e., move the position forward and back). In other embodiments, this can involve using a dielectric fluid insulator to actuate the at least one linear actuator.

Applying a tension force on inner conductor proximal first end 118 can limit, mitigate, or even eliminate, deflection of inner conductor 108 within the internal passage 116. By limiting deflection, the tension force applied at 850 can reduce the occurrences of short circuits and/or arcing along the length of coaxial transmission line 100. As described above, short circuits and/or arcing can cause severe burns, fires and/or permanent damage to coaxial transmission line 100.

Optionally, method 800 may include step 860 which comprises determining a tension of inner conductor 108. This can involve detecting a load on the linear actuator(s) using one or more suitably positioned load sensors. As an example, FIG. 4A to FIG. 4C show tensioning device 200 with load cells 234 located in different positions. As another example, FIG. 4D shows tensioning device 200 with a pressure transmitter 236 coupled to linear actuator 202*a*. Other types of sensors and configurations are possible. As described above with reference to FIG. 3A, sensor 134 can be communicatively coupled to electronic control device 500. This connection can allow electronic control device 500 and sensor 134 to communicate and/or relay signals with each other. Processor 502 of electronic control device 500 may be configured to determine the tension of inner conductor 108 based on received load signal(s) from sensor(s) 134.

Optionally, method 800 may include step 870 which comprises adjusting the actuation of the at least one linear actuator based at least in part on the tension of inner conductor 108 determined at step 860. As described above with reference to FIG. 3A, processor 502 can be configured to control operation of one or more linear actuators (e.g., actuator 202) based on the determined tension. In some embodiments, step 870 can involve automatically adjusting the actuation of the at least one linear actuator to obtain a target tension of the inner conductor 108. The target tension may be stored in memory 506 (FIG. 3A) and adjusted as needed.

Figure 10:
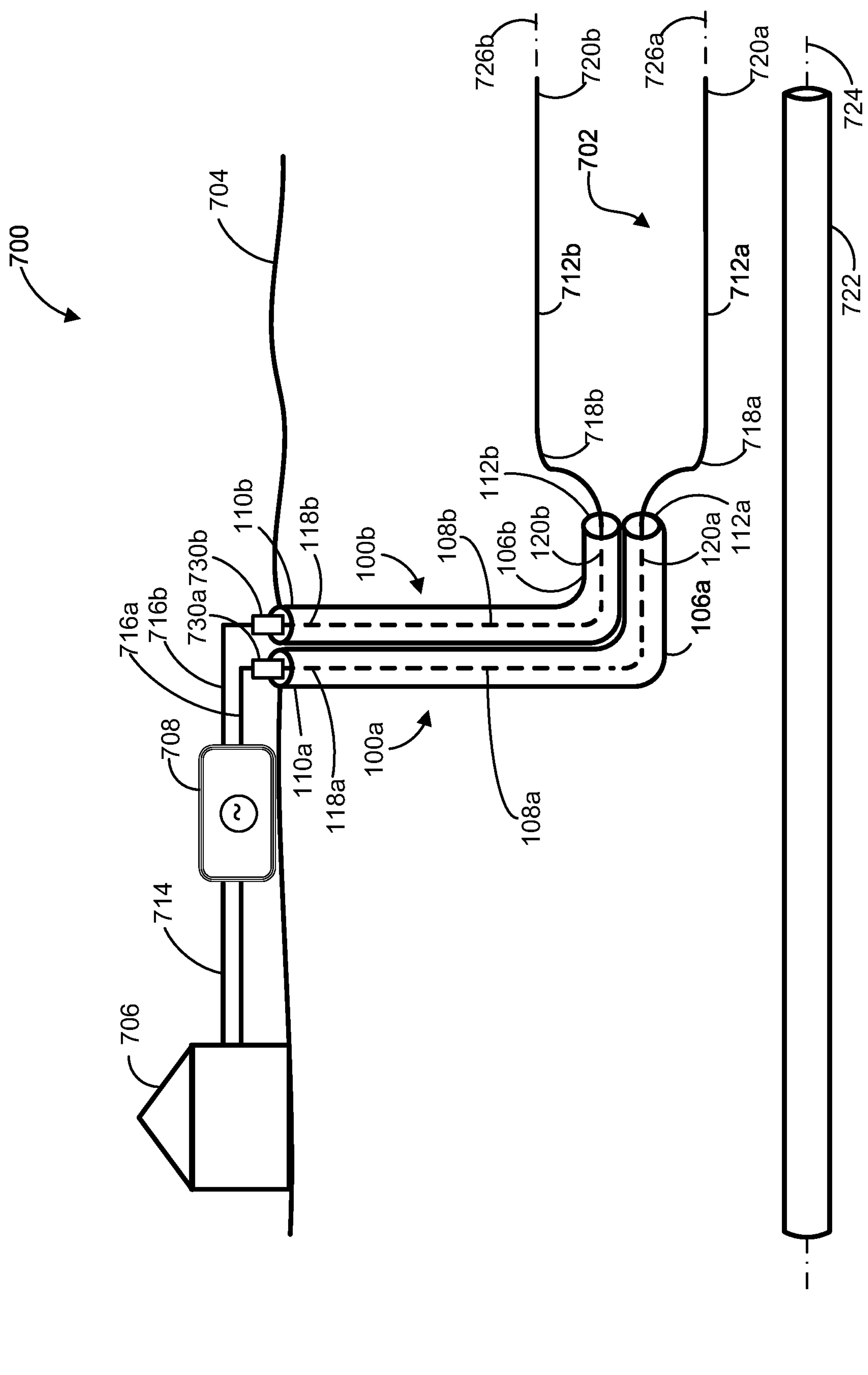
FIG. 10 is a schematic illustration of an example system for electromagnetic heating of hydrocarbon formations using the coaxial transmission line of FIG. 1A.

Reference is now made to FIG. 10, which shows a schematic illustration of an electromagnetic heating system 700. System 700 can be used for electromagnetic (EM) heating of an underground hydrocarbon formation 702. The application of EM energy can heat hydrocarbon formation 702. This can reduce viscosity and/or mobilize bitumen and heavy oil within hydrocarbon formation 702 for production. Hydrocarbon formation 702 can include heavy oil formations, oil sands, tar sands, carbonate formations, shale oil formations, and any other hydrocarbon bearing formations, or any other mineral.

As shown, system 700 includes an electrical power source 706, an electromagnetic (EM) wave generator 708 (also referred to as a signal generator), tensioning devices 730*a*, 730*b* (collectively referred to as tensioning devices 730), coaxial transmission lines 100*a*, 100*b*, and transmission line conductors 712*a*, 712*b* (collectively referred to as transmission line conductors 712). In alternative embodiments, transmission line conductors 712 may be another type of electromagnetic load, such as, for example, an EM radiator.

Coaxial transmission lines 100*a*, 100*b* can be similar to coaxial transmission line 100 of FIG. 1A, having inner conductors 108*a*, 108*b* similar to inner conductor 108 and outer conductors 106*a*, 106*b* similar to outer conductor 106. It will be appreciated that reference made to coaxial transmission line 100 can also relate to coaxial transmission lines 100*a*, 100*b*; reference made to inner conductor 108 can also relate to inner conductors 108*a*, 108*b*; and reference made to outer conductor 106 can also relate to outer conductors 106.

Tensioning devices 730 can apply tension to the inner conductors 108*a*, 108*b* of the coaxial transmission lines 100*a*, 100*b*. For example, tensioning devices 730 can be any one of tensioning device 200 of FIG. 2A, tensioning device 300 of FIG. 5, or tensioning device 400 of FIG. 7. System 700 is intended to illustrate one of many possible uses of coaxial transmission line 100 of FIG. 1A. Its inclusion is not intended to be limiting. Tensioning devices 730 may be used in any coaxial transmission line 100 where different thermal expansion is expected between the inner and outer conductors. Furthermore, coaxial transmission line 100 is not limited to the delivery of radio frequency (RF) power in below surface cables. Coaxial transmission line 100 can be used in the delivery of alternating current (AC), direct current (DC), or radio frequency (RF) power in above surface or below surface cables.

FIG. 10 shows electrical power source 706 located above the earth's surface 704. Alternately, electrical power source 706 can be located below the earth's surface 704 (i.e., underground). Electrical power source 706 generates electrical power and can be any appropriate source of electrical power, such as, for example a stand-alone electric generator or an electrical grid. Electrical power source 706 may include transformers and/or rectifiers for providing electrical power with desired and/or required parameters. The electrical power can be one of alternating current (AC) or direct current (DC). Power cable 714 carries the electrical power from electrical power source 706 to EM wave generator 708.

EM wave generator 708 generates EM power. It will be understood that EM power can be generated in various forms, including high frequency alternating current, alternating voltage, current waves, or voltage waves. For example, the EM power can be a periodic high frequency signal having a fundamental frequency ($f_0$). The high frequency signal may have a sinusoidal waveform, square waveform, or any other appropriate signal shape. The high frequency signal can further include harmonics of the fundamental frequency. For example, the high frequency signal can include second harmonic $2f_0$, and third harmonic $3f_0$ of the fundamental frequency $f_0$. In some embodiments, the EM wave generator 708 can produce more than one frequency at a time. In some embodiments, the frequency and shape of the high frequency signal may change over time. The term "high frequency alternating current", as used herein, broadly refers to a periodic, high frequency EM power signal, which in some embodiments, can be a voltage signal.

FIG. 10 shows EM wave generator 708 located above the earth's surface 704 (i.e., aboveground). Locating EM wave generator 708 aboveground can facilitate deployment. Alternatively, EM wave generator 708 can be located underground. In cases where EM wave generator 708 is located underground, transmission losses can be reduced because EM energy is not dissipated in areas that do not produce hydrocarbons.

High frequency connectors 716*a*, 716*b* (collectively referred to as high frequency connectors 716) can carry high frequency alternating current from EM wave generator 708 to corresponding coaxial transmission lines 100*a*, 100*b*. In the example shown in FIG. 10, each high frequency connector 716*a*, 716*b* carries high frequency alternating current from EM wave generator 708 to the inner conductor 108*a*, 108*b* of a corresponding coaxial transmission line 100*a*, 100*b*. In some cases, the high frequency alternating current being transmitted to each coaxial transmission line 100*a*, 100*b* over high frequency connectors 716 may be substantially identical. In this context, the expression "substantially identical" is intended to mean sharing the same waveform shape, frequency, amplitude, and being synchronized. In other cases, the high frequency alternating current being transmitted to a coaxial transmission line 100*a* over a high frequency connector 716*a* may be a phase-shifted version of the high frequency alternating current being transmitted to the another coaxial transmission line 100*b*. In this context, the expression "phase-shifted version" is intended to mean sharing the same waveform, shape, frequency, and amplitude but not being synchronized. As an example, the phase-shift can be a 180° phase shift. As another example, the phase-shift can be an arbitrary phase shift so as to produce an arbitrary phase difference.

Coaxial transmission lines 100*a*, 100*b* can carry high frequency alternating current from EM wave generator 708 to corresponding transmission line conductor 712*a*, 712*b*. Each transmission line conductor 712*a*, 712*b* can be coupled to EM wave generator 108 via respective coaxial transmission lines 100. Accordingly, each coaxial transmission line 100*a*, 100*b* may be characterized as a waveguide for high frequency alternating current.

As described above, each inner conductor 108*a*, 108*b* extends between an inner conductor first end 118*a*, 118*b* and an inner conductor second end 120*a*, 120*b*, respectively. Each outer conductor 106*a*, 106*b* extends between an outer conductor first end 110*a*, 110*b* and an outer conductor second end 112*a*, 112*b*, respectively. Each inner conductor second end 120*a*, 120*b* can be electrically coupled to a corresponding transmission line conductor 712*a*, 712*b* in any suitable manner. For example, a latching mechanism may be used. Optionally, each outer conductor first end 110*a*, 110*b* may be electrically coupled to EM wave generator 708, typically to its ground.

In some embodiments, outer conductors 106*a*, 106*b* of coaxial transmission lines 100*a*, 100*b* may be a wellbore casing, typically a conductive pipe. As described above, the conductive pipe can be made of a conductive metal (e.g., copper, iron, etc.) or another suitable conductive material. In these embodiments, inner conductors 108*a*, 108*b* can be a pipe, cable, wire, or conductor rod that is passed through the wellbore casing. In embodiments where coaxial transmission line 100*a*, 100*b* is a coaxial cable, the outer and inner cables of the coaxial cable provide the respective outer conductors 106*a*, 106*b* and inner conductors 108*a*, 108*b* of coaxial transmission lines 100*a*, 100*b*.

Referring still to FIG. 10, each coaxial transmission line 100*a*, 100*b* has a substantially vertical portion followed by a substantially horizontal portion. This gives each illustrated coaxial transmission line 100*a*, 100*b* an L-shape. In this context, the terms "vertical" and "horizontal" are used in relation to the earth's surface 704. Other configurations are possible, including embodiments where at least a portion of one or more coaxial transmission lines 100*a*, 100*b* are non-linear (e.g., angled or curved).

As shown, each transmission line conductor 712*a*, 712*b* is coupled to EM wave generator 708 via corresponding coaxial transmission lines 100. The system 700 of FIG. 10 includes two transmission line conductors 712. In alternative embodiments, additional transmission line conductors 712 can be coupled to each coaxial transmission line 100*a*, 100*b*. Various configurations of the transmission line conductors 712 are possible. For example, both transmission line conductors 712 can be conductive pipes. Alternatively, only one or none of the transmission line conductors 712 are conductive pipes. Alternatively, or in addition, one or both of the transmission line conductors 712 can be conductor rods, coiled tubing, or coaxial cables, or any other suitable conduit capable of propagating EM energy from EM wave generator 708.

In the embodiment shown, transmission line conductors 712 are positioned in direct contact with hydrocarbon formation 702. Alternatively, transmission line conductors 712 can be electrically isolated or partially electrically isolated from hydrocarbon formation 702.

Each transmission line conductor 712*a*, 712*b* has a proximal end 718*a*, 718*b* (proximate coaxial transmission lines 100) (collectively referred to as proximal ends 718) and a distal end 720*a*, 720*b* (spaced apart from coaxial transmission lines 100) (collectively referred to as distal ends 720). The proximal end 718*a*, 718*b* of each transmission line conductor 712*a*, 712*b* can be coupled to EM wave generator 708. In the embodiment shown, the proximal end 718*a*, 718*b* of each transmission line conductor 712*a*, 712*b* is coupled to EM wave generator 708 via corresponding coaxial transmission lines 100*a*, 100*b*.

Transmission line conductors 712 can be excited by the high frequency alternating current generated by EM wave generator 708. When excited, transmission line conductors 712 can form an open transmission line that includes transmission line conductors 712 and hydrocarbon formation 702. The open transmission line can propagate EM energy that is contained within a cross-section of a radius of several meters to several tens of meters depending on the frequency of excitation. The open transmission line can propagate an EM wave from the proximal ends of transmission line conductors 712 to the distal ends 720 of transmission line conductors 712. The open transmission line can also propagate a reflected EM wave in the opposite direction from the distal ends 720 to the proximal ends 718 of transmission conductor lines 712 upon reflection of the EM wave at the distal ends 720.

Optionally, the EM wave may establish a standing wave along the transmission line conductors 712. Alternatively, the propagating electromagnetic wave may form a standing electromagnetic wave or an exponentially decaying wave depending on the loss properties of the medium and the frequency of generator excitation.

An open transmission line can carry and dissipate energy within a dielectric medium. In the embodiment shown, hydrocarbon formation 702 between transmission line conductors 712 can act as a dielectric medium for the open transmission line formed by the transmission line conductors 712. The open transmission line can carry and dissipate energy within this dielectric medium, that is, hydrocarbon formation 702.

The open transmission line carrying EM energy within hydrocarbon formation 702 can be referred to as a "dynamic transmission line" as medium properties change over time. Transmission line conductors 712 can be configured to propagate an EM wave in both directions. This can allow the dynamic transmission line to carry EM energy within long well bores (as used herein, well bores spanning a length of 500 meters (m) to 1500 meters (m) or more can be considered long well bores).

Producer well 722 is typically located at or near the bottom of the underground reservoir. Producer well 722 can be configured to receive heated oil released from the hydrocarbon formation 702 by the EM heating process. The heated oil can drain mainly by gravity to the producer well 722.

Producer well 722 has a producer well central axis 724. Similarly, each transmission line conductor 712*a*, 712*b* has a transmission line central axis 726*a*, 726*b*, respectively. In the embodiment shown, producer well central axis 724 is parallel with each transmission line central axis 726*a*, 726*b*. Other arrangements are possible. Producer well 722 can be located at the same depth or at a greater depth than (i.e., below) at least one of the transmission line conductors 712.

In some embodiments, transmission line conductors 712 may have both substantially vertical and substantially horizontal portions. Other configurations are possible, including embodiments where at least a portion of one or more transmission line conductors 712 are non-linear (e.g., angled or curved).

Producer well 722 can be positioned laterally between transmission line conductors 712. For example, producer well 722 may be laterally equidistant from each transmission line conductor 712*a*, 712*b*. Alternatively, producer well 722 can be positioned with any appropriate lateral offset to one of the transmission line conductors 712. In some applications, it can be advantageous to position producer well 722 closer to one of the transmission line conductors 712. This may allow the region closer to that transmission line conductor 712 to heat up faster and contribute to early onset of oil production.

Various well holes are drilled and completed to provide producer well 722 and transmission line conductors 712. In some embodiments, a wellbore (i.e., well hole) for the producer well 722 can be drilled and completed similar to a producer well of a conventional steam assisted gravity drain system.

Although system 700 illustrated in FIG. 10 includes two coaxial transmission lines 100, two transmission line conductors 712, and one producer well 722, alternative embodiments can include additional coaxial transmission lines 100*a*, 100*b*, additional transmission line conductors 712, and/or additional producer wells 722.

As described above with reference to FIG. 2A, tensioning devices 730 acts to apply a tension force to inner conductors 108*a*, 108*b*. The applied tension force can limit or prevent deflection of inner conductor 108*a*, 108*b* within an internal passage, such as internal passage 116 shown in FIG. 1B, thereby reducing occurrences of short circuits and/or arcing along coaxial transmission lines 100*a*, 100*b*. An example of this type of unwanted deflection is shown in FIG. 1C between adjacent centralizers 130. In the context of system 700, deflection of inner conductor 108*a*, 108*b* within internal passage 116 may be caused by differential thermal expansion of outer conductors 106*a*, 106*b* and inner conductors 108*a*, 108*b*. During operation, inner conductors 108*a*, 108*b* may heat up more than outer conductor 106*a*, 106*b*, causing it to expand more than outer conductor 106*a*, 106*b*. This differential thermal expansion can lead to buckling of inner conductor 108*a*, 108*b* within internal passage 116 of outer conductor 106*a*, 106*b*. In some cases, the buckling can be so pronounced that outer conductors 106*a*, 106*b* and inner conductors 108*a*, 108*b* make contact. Furthermore, gravity may contribute to the deflection of inner conductor 106*a*, 106*b* in the horizontal portion of coaxial transmission line 100*a*, 100*b* shown in FIG. 10. In limiting or preventing the occurrence of short circuits and/or arcing, tensioning devices 730 can limit or prevent the negative impacts associated with short circuits and arcing. This can include burns, fires and/or permanent damage to coaxial transmission line 100*a*, 100*b*.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A coaxial transmission line comprising:
an inner conductor having a longitudinal axis and extending from a first end to a second end, the second end of the inner conductor being fixed to an electromagnetic load;
an outer conductor surrounding the inner conductor along the longitudinal axis; and
at least one linear actuator coupled to the inner conductor at the first end for applying a tension force to the inner conductor,
wherein the at least one linear actuator comprises a plurality of linear actuators positioned circumferentially around the longitudinal axis of the inner conductor at the first end.

2. The coaxial transmission line of claim 1, wherein the at least one linear actuator comprises one or more coupling elements for coupling the at least one linear actuator to the inner conductor, at least a portion of the one or more coupling elements is non-conductive.

3. The coaxial transmission line of claim 1, wherein the at least one linear actuator comprises one of a hydraulic actuator or an electromagnetic actuator.

4. The coaxial transmission line of claim 1, further comprising a gas actuation system that is separate from a dielectric fluid isolating the inner conductor; and wherein the at least one linear actuator comprises a pneumatic actuator actuable by the gas actuation system.

5. The coaxial transmission line of claim 1, wherein:
the at least one linear actuator comprises a pneumatic actuator; and
the coaxial transmission line further comprises a dielectric fluid insulator for isolating the inner conductor from the outer conductor and for actuating the pneumatic actuator.

6. The coaxial transmission line of claim 1, wherein the plurality of linear actuators are positioned circumferentially around at least part of the inner conductor at the first end.

7. The coaxial transmission line of claim 1, further comprising a crosshead for coupling the plurality of linear actuators to the inner conductor at the first end.

8. The coaxial transmission line of claim 7, wherein the crosshead is non-conductive.

9. The coaxial transmission line of claim 1, wherein each of the plurality of linear actuators comprise an actuator housing and a piston therein, the plurality of actuator housings is coupled to the outer conductor.

10. The coaxial transmission line of claim 1, wherein the at least one linear actuator is automatically adjusted to obtain a target tension of the inner conductor.

11. The coaxial transmission line of claim 10, wherein:
the at least one linear actuator comprises one of a hydraulic actuator or a pneumatic actuator; and
the coaxial transmission line further comprises at least one pressure control valve and an accumulator for automatically adjusting the at least one linear actuator.

12. A coaxial transmission line comprising:
an inner conductor having a longitudinal axis and extending from a first end to a second end, the second end of the inner conductor being fixed to an electromagnetic load;
an outer conductor surrounding the inner conductor along the longitudinal axis;

at least one linear actuator coupled to the inner conductor at the first end for applying a tension force to the inner conductor; and one or more sensors for detecting a load on the at least one linear actuator, wherein the at least one linear actuator is automatically adjusted to obtain a target tension of the inner conductor and the tension force applied by the at least one linear actuator is adjustable based at least in part on the load detected by the one or more sensors.

13. The coaxial transmission line of claim 12, wherein the one or more sensors comprise at least one of a load cell or a pressure transmitter.

14. The coaxial transmission line of claim 1, wherein at least a portion of the longitudinal axis is non-linear.

15. A method of providing a coaxial transmission line, the method comprising:

providing an inner conductor having a longitudinal axis and extending from a first end to a second end;

fixing the second end of the inner conductor to an electromagnetic load;

providing an outer conductor that surrounds the inner conductor;

coupling at least one linear actuator to the inner conductor at the first end; and actuating the at least one linear actuator to apply a tension force to the inner conductor, wherein coupling the at least one linear actuator to the inner conductor comprises coupling a plurality of linear actuators circumferentially around the longitudinal axis of the inner conductor at the first end.

16. The method of claim 15, wherein actuating the at least one linear actuator to apply a tension force to the inner conductor comprises using a gas actuation system to actuate the at least one linear actuator.

17. The method of claim 15, wherein actuating the at least one linear actuator to apply a tension force to the inner conductor comprises using a dielectric fluid insulator for isolating the inner conductor from the outer conductor and actuating the at least one linear actuator.

18. The method of claim 15, wherein coupling the plurality of linear actuators circumferentially around the longitudinal axis of the inner conductor at the first end comprises positioning the plurality of linear actuators around at least part of the inner conductor at the first end.

19. The method of claim 15, wherein coupling the plurality of linear actuators to the inner conductor at the first end comprises:

coupling a crosshead to the inner conductor; and coupling each of the plurality of linear actuators to the crosshead.

20. The method of claim 15, wherein each of the plurality of linear actuators comprise an actuator housing and a piston therein, the plurality of actuator housings is coupled to the outer conductor.

21. The method of claim 15, further comprising automatically adjusting the actuation of the at least one linear actuator to a target tension.

22. The method of claim 21, wherein:

the at least one linear actuator comprises one of a hydraulic actuator or a pneumatic actuator; and automatically adjusting the actuation of the at least one linear actuator to a target tension comprises operating at least one pressure control valve to allow receipt or release of fluid or gas to and from an accumulator.

23. A method of providing a coaxial transmission line, the method comprising:

providing an inner conductor having a longitudinal axis and extending from a first end to a second end;

fixing the second end of the inner conductor to an electromagnetic load;

providing an outer conductor that surrounds the inner conductor;

coupling at least one linear actuator to the inner conductor at the first end;

actuating the at least one linear actuator to apply a tension force to the inner conductor; and automatically adjusting the actuation of the at least one linear actuator to a target tension by:

detecting a load on the at least one linear actuator; and adjusting the actuation of the at least one linear actuator based at least in part on the load detected.

24. The method of claim 23, wherein detecting the load on the at least one linear actuator comprises detecting the load using at least one of a load cell or a pressure transmitter.

25. The coaxial transmission line of claim 12, wherein a central axis of the at least one linear actuator is coaxial with the longitudinal axis of the inner conductor.

26. The method of claim 23, wherein a central axis of the at least one linear actuator is coaxial with the longitudinal axis.

* * * * *